United States Patent [19]

Tomita

[11] Patent Number: 4,594,599
[45] Date of Patent: Jun. 10, 1986

[54] IMAGE RECORDING METHOD

[75] Inventor: Satoru Tomita, Kawasaki, Japan

[73] Assignee: Ricoh Company, Ltd., Tokyo, Japan

[21] Appl. No.: 690,343

[22] Filed: Jan. 10, 1985

[30] Foreign Application Priority Data

| Jan. 13, 1984 | [JP] | Japan | 59-5190 |
| Jan. 13, 1984 | [JP] | Japan | 59-5191 |
| Jan. 24, 1984 | [JP] | Japan | 59-11603 |
| Jan. 24, 1984 | [JP] | Japan | 59-11604 |
| Jan. 24, 1984 | [JP] | Japan | 59-11605 |
| Jan. 24, 1984 | [JP] | Japan | 59-11606 |

[51] Int. Cl.$^4$ .................. G01D 15/14; G01D 9/42; H04N 1/23
[52] U.S. Cl. .................. 346/160; 346/1.1; 346/108; 358/300
[58] Field of Search .................. 346/160, 108, 1.1; 358/300, 302

[56] References Cited

U.S. PATENT DOCUMENTS 4,257,053  3/1981  Gilbreath .................. 346/108
4,525,729  6/1985  Aqulnek et al. .................. 358/300

Primary Examiner—E. A. Goldberg
Assistant Examiner—Linda M. Peco
Attorney, Agent, or Firm—Cooper, Dunham, Clark, Griffin & Moran

[57] ABSTRACT

An image recording method capable of allowing an optical scan type electrophotographic recording apparatus to record images with a high resolution. The pulse width of video data adapted to modulate a light beam is varied. An optimum light beam scanning condition is provided which causes the pulse width of binary video data to be controlled to suitably vary the power of an exposing beam such that a latent image potential difference at a boundary between an image portion and a non-image portion is increased to enhance electrostatic contrast, thereby recording images with a high resolution. In an optical scan type electrophotographic recording apparatus of the type using minute light emitting segments as a light source, a latent image is formed with high electrostatic contrast. A light beam condition and a light beam scanning condition are provided which makes the pixel diameters of an image to be developed in the main scan and subscan directions equal to each other. Also, a light beam condition and a light beam scanning condition are provided which confine a ratio between the width of a latent image line substantially parallel to a developing direction and that of a latent image line substantially perpendicular to the developing direction to an optimum range.

13 Claims, 45 Drawing Figures

FIG. 1
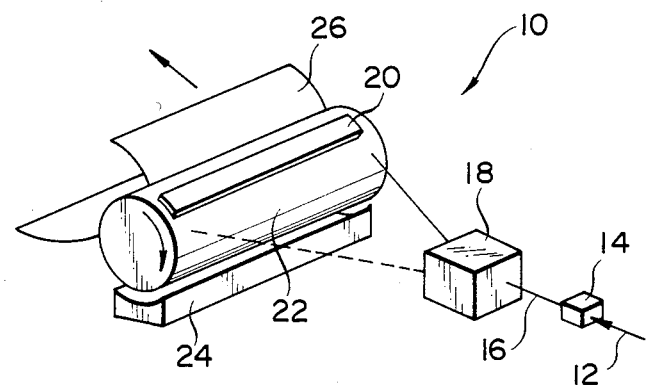
FIG. 6
FIG. 7
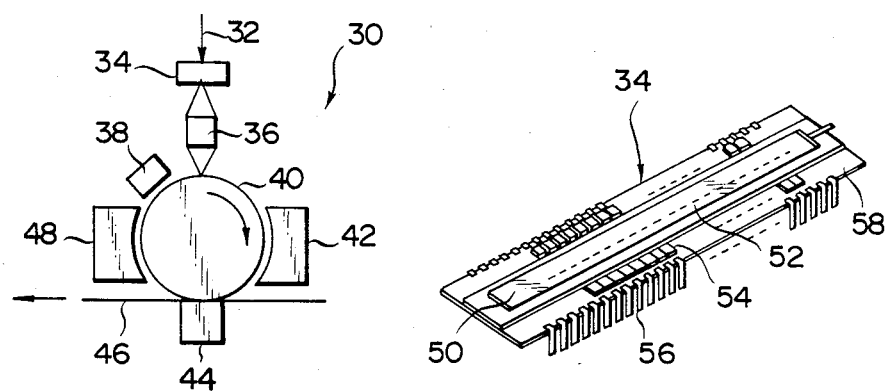

IMAGE RECORDING METHOD

BACKGROUND OF THE INVENTION

The present invention relates to an image recording method for an optical scan type electrophotographic recording apparatus and, further, to an image recording method for an optical scan type electrophotographic recording apparatus of the kind which uses minute light emitting segments as a light source.

Generally, in a laser printer or like optical scan type electrophotographic recording apparatus, a light beam modulated by binary video data is manipulated to sequentially expose a photoconductive element to form a latent image electrostatically thereon. The problem encountered with this kind of image recording is that because the pulse width of video data per pixel and, therefore, the ratio of a light beam exposing time to a one-pixel scanning time is fixed, the latent image potential in an image portion which borders a non-image portion is lowered due to building and falling of the latent image potential. Such causes the image to be developed to have different pixel diameters in the main scan and subscan directions and, thereby, considerably lowers the resolution. Especially, when it comes to document images, characters are prevented from appearing clear-cut.

Japanese Patent Laid-Open Publication No. 56-8112/1981 discloses an implementation for an optical scan type electrophotographic recording apparatus which modulates the pulse width of video data in order to eliminate thinning of images which is apt to occur during positive-to-positive recording, which develops unexposed portions. However, it fails to improve the quality of recoded images when a countermeasure is provided against thinning in the main scan direction only. That is, it cannot offer a desirable image quality unless a countermeasure covering both the main scan and subscan directions is provided in due consideration of gitter occurring on a photoconductive element, developing method, developing characteristics, etc. In that case, reproducibility on a one-dot line basis is very important.

Meanwhile, the countermeasure against thinning and a measure for an improvement in resolution, which the present invention contemplates, are contradictory to each other; the anti-thinning measure is not always advantageous in enhancing or stabilizing the image quality. That is, whether the recording be negative-to-positive which develops exposed portions or positive-to-negative which develops unexposed portions, attaching importance to the resolution rather than anti-thinning is advantageous from the viewpoint of improvement or stabilization of the image quality.

An optical scan type electrophotographic recording apparatus has been proposed which is elaborated to free a laser printer from the intricacy of construction of its optical system (Japanese Patent Laid-Open Publication No. 58-108864) and other problems. In the proposed apparatus, to simplify a light source and an optical system, a light source comprises a phosphor dot array tube having an array of phosphor elements arranged in the main scan direction in correspondence with pixels. Light issuing from the phosphor dot tube and modulated by binary video data is passed through an imaging system toward a photoconductive element, which is fed in the subscan direction, to provide a latent image thereon, the latent image being developed to record data associated with the video data.

However, due to the use of minute, light emitting phosphor elements as a light source, the above-described prior art method limits the available potential of latent images and, thereby, electrostatic contrast. This is apt to cause the resolution in the subscan direction to fluctuate due to gitter on the surface of the photoconductive element, greatly effecting the quality of the entire recorded images.

In addition, the dot array tube type scheme cannot accomplish a sufficient resolution, particularly sufficient reproducibility of hairlines such as one-dot lines. Specifically, because with respect to the main scan direction the intensity distribution of the light issuing from the regularly arranged light emitting elements has great influence and because, with respect to the subscan direction, the light emitting elements emit light at a predetermined timing associated with the movement of the photoconductive element in the subscan direction, in the case of recording hairlines such as one-dot lines, the width of the lines to be developed differs from the main scan direction to the subscan direction thereby deteriorating the resolution.

SUMMARY OF THE INVENTION

It is therefore a first object of the present invention to provide an image recording method which allows an optical scan type electrophotographic recording apparatus to record images with a high resolution.

It is a second object of the present invention to provide an image recording method which allows an optical scan type electrophotographic recording apparatus of the type using minute light emitting segments as a light source to provide latent images with considerable electrostatic contrast.

It is a third object of the present invention to provide an image recording method which allows an optical scan type electrophotographic recording apparatus to record high resolution images which have the same pixel diameter both in the main scan and subscan directions.

It is a fourth object of the present invention to provide an image recording method which allows an optical scan type electrophotographic recording apparatus of the type using minute light emitting elements as a light source to record high resolution images which have the same pixel diameter in both the main scan and subscan directions.

It is a fifth object of the present invention to provide an image recording method which allows an optical scan type electrophotographic recording apparatus to record images with desirable reproducibility on a one-dot line basis by controlling the formation of a latent image during exposure.

It is a sixth object of the present invention to provide an image recording method which allows an optical scan type electrophotographic recording apparatus of the type using minute light emitting elements as a light source to record high resolution images excellent in reproducibility on a one-dot line basis by controlling the formation of a latent image during exposure.

It is another object of the present invention to provide a generally improved image recording method.

In one aspect of the present invention, in an image recording method using an optical scan type electrophotographic recording apparatus which includes a device for varying a pulse width of video data which modulate a light beam, there is provided the improvement wherein a light beam scans such that at a boundary between an image portion and a non-image portion a ratio of a light beam exposing time to a one-pixel scanning time satisfies a condition $0.2 \leq Td \leq 1.1$.

In another aspect of the present invention, in an image recording method using an optical scan type electrophotographic recording apparatus which modulates by binary video data light issuing from minute light emitting segments which are associated with pixels, passes the modulated light through an imaging system to a surface of a photoconductive element to form an electrostatic latent image, and develops the latent image to record data associated with the video data, there is provided the improvement wherein a pulse width of video data for modulating the light issuing from the light emitting segments is varied.

In another aspect of the present invention, in an image recording method for an optical scan type electrophotographic recording apparatus, there is provided the improvement wherein a light beam scans such that a ratio $\rho_y/\rho_x$ where $\rho_x$ indicates a ratio of a beam diameter in a main scan direction to a pixel pitch in the main scan direction and $\rho_y$ indicates a ratio of a beam diameter in a subscan direction to a pixel pitch in the subscan direction satisfies a condition $1.0 \leq \rho_y/\rho_x \leq 1.5$, and that a product of the ratio $\rho_y$ and a ratio Td of an exposing time by the light beam to a one-pixel scanning time at a boundary between an image portion and a non-image portion satisfies a condition $0.5 \leq \rho_x \cdot Td \leq 1.5$.

In another aspect of the present invention, in an image recording method using an optical scan type electrophotographic recording apparatus which modulates by binary video data light issuing from minute light emitting segments which are associated with pixels, passes the modulated light through an imaging system to a surface of a photoconductive element to form an electrostatic latent image, and develops the latent image to record data associated with the video data, there is provided the improvement wherein a pulse width of video data is varied such that a ratio $\rho_y/\rho_x$ where $\rho_x$ indicates a ratio of a beam diameter in a main scan direction to a pixel pitch in the main scan direction and $\rho_y$ indicates a ratio of a beam diameter in a subscan direction to a pixel pitch in the subscan direction satisfies a condition $0.6 \leq \rho_y/\rho_x \leq 1.0$, and that a product of the ratio $\rho_y$ and a ratio Tp of an exposing time to a one-pixel scanning time at a boundary between an image portion and a non-image portion satisfies a condition $0.5 \leq \rho_x \cdot Tp \leq 1.5$.

In another aspect of the present invention, in an image recording method using an optical scan type electrophotographic recording apparatus, there is provided the improvement wherein a light beam scans such that a ratio lc/lp where lp indicates a width of a latent image line substantially parallel to a developing direction and lc indicates a width of a latent image line substantially perpendicular to the developing direction satisfies a condition $1.0 \leq lc/lp \leq 1.2$.

In another aspect of the present invention, in an image recording method using an optical scan type electrophotographic recording apparatus which modulates by binary video data light issuing from minute light emitting segments which are associated with pixels, passes the modulated light through an imaging system to a surface of a photoconductive element to form an electrostatic latent image, and develops the latent image to record data associated with the video data, there is provided the improvement wherein a light beam scans such that a ratio lc/lp and lp indicates a width of a latent image line substantially parallel to a developing direction and lc indicates a width of a latent image line substantially perpendicular to the developing direction satisfies a condition $1.0 \leq lc/lp \leq 1.3$.

The above and other objects, features and advantages of the present invention will become apparent from the following detailed description taken with the accompanying drawings.

BRIEF DESCRIPTION OF THE DRAWINGS

FIG. 1 is a schematic view of an ordinary optical scan type electrophotographic recording apparatus to which the first, third and fifth embodiments of the present invention are applied;

FIG. 6 is a schematic view of an optical scan type electrophotographic recording apparatus using a phosphor dot array tube as a light source and to which the second, fourth and sixth embodiments of the present invention are applied;

FIG. 7 is a perspective view of an example of the phosphor dot aray tube shown in FIG. 6;

DESCRIPTION OF THE PREFERRED EMBODIMENTS

Figure 2:
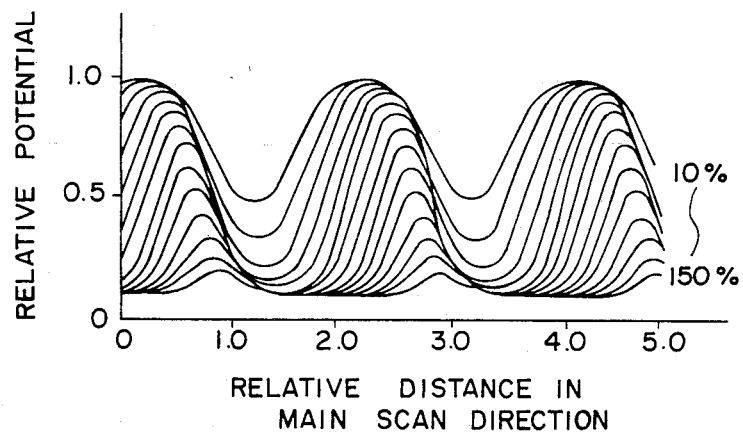
FIG. 2 is a graph showing a relationship between a relative potential and a relative distance associated with a pattern which was exposed at every two pixels in the main scan direction in the first and second embodiments.

While the image recording method of the present invention is susceptible of numerous physical embodiments, depending upon the environment and requirements of use, substantial numbers of the herein shown and described embodiments have been made, tested and used, and all have performed in an eminently satisfactory manner.

A first embodiment of the present invention elaborated to achieve the first object will be described first.

An image recording method in accordance with the first embodiment is implemented by means which is capable of varying the pulse width of video data which modulate a light beam in an optical scan type electrophotographic recording apparatus. Light beam scanning is effected such that the ratio of a light beam exposing time to a one-pixel scanning time satisfies a condition which will be described at boundaries between image portions and non-image portions, so that the latent image potential in the image portions may be increased at the boundaries.

In this particular embodiment, in recording images by such an optical scan type electrophotographic recording apparatus as one 10 shown in FIG. 1, an optimum light beam scanning condition is provided which is such that the pulse width of binary image data is controlled to suitably vary the power of an exposing beam to enhance the latent image potential difference at a border between image and non-image portions and, thereby, the electrostatic contrast, thereby providing recorded images with high resolution.

In the recording apparatus 10 shown in FIG. 1, a light source 14 which comprises a laser diode is turned on and off by binary data 12 to produce a directly modulated laser beam 16. The laser beam 16 is routed through an optical scanning system and compensating optical system 18 to sequentially illuminate in a main scan direction a drum-like photoconductive element 22 which is fed in a subscan direction and deposited with a uniform charge by a charger 20. The resulting latent image formed on the drum 22 is developed by a developing unit 24 and, then, transferred to a paper 26 in a transfer station. In this construction, images are recorded in a predetermined density which depends upon the scanning rate of the laser beam in the main scan direction and the linear velocity of the drum 22 in the subscan direction. Alternatively, a beam emanating from a gas laser may be modulated by means of an acoustooptical modulator in response to binary data.

Referring to FIG. 2, there is shown a characteristic associated with a pattern provided by exposing a photoconductive element at every two pixels in the main scan direction (i.e. a stripe pattern repeating at every one of black and white lines which extend in the subscan direction). In FIG. 2, the abscissa shows a relative distance which is a ratio of each exposure distance to a pixel pitch in the main scan direction, while the ordinate shows a relative potential which is a ratio of each exposed surface potential to a surface potential of the uniformly charged drum 22. A parameter in the plot of FIG. 2 is a pixel frequency duty, i.e., a ratio of an exposure time to a one-pixel exposure time, which is varied over a range of 10-150%.

It will be seen from FIG. 2 that as the pixel frequency duty increases, the bottoms of the surface potential become shallower and the peaks, lower. This implies that the pixel frequency duty constitutes one of various conditions which allow the boundaries between black and white in recorded images, or image and non-image portions, to appear clear-cut and set up adequate black and white line widths, and that an adequate pixel frequency duty exists in the above-discussed range.

Figure 3:
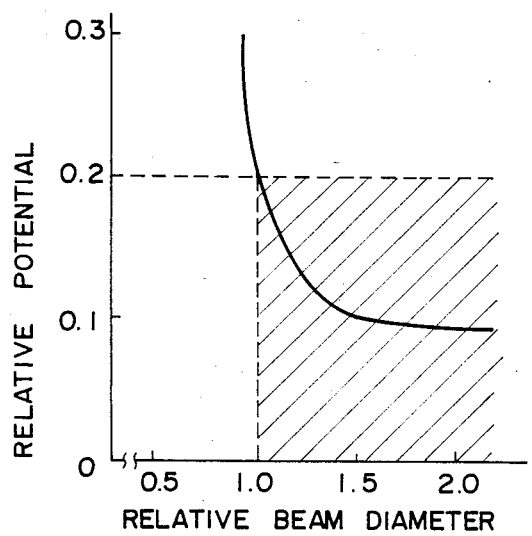
FIG. 3 is a graph showing a relative potential and a relative beam diameter provided by fully exposing lines in the horizontal scan direction.

For the selection of an adequate pixel frequency duty, it is a primary requisite to determine an adequate range of the ratio of the beam diameter to the pixel pitch. FIG. 3 shows a curve representative of ratios between the peak of surface potential on the drum 22 resulted from the full exposure of lines in the main scan direction and the surface potential on the drum 22 resulted from zero exposure energy. In FIG. 3, the abscissa indicates a relative beam diameter which is the ratio of a beam diameter to a pixel pitch in the main scan direction and the ordinate, a relative potential. It is known by experience that a relative potential lower than about 0.2 is desirable in which case, as shown in FIG. 3, the beam diameter to pixel pitch ratio is larger than about 1.0.

Figure 4:
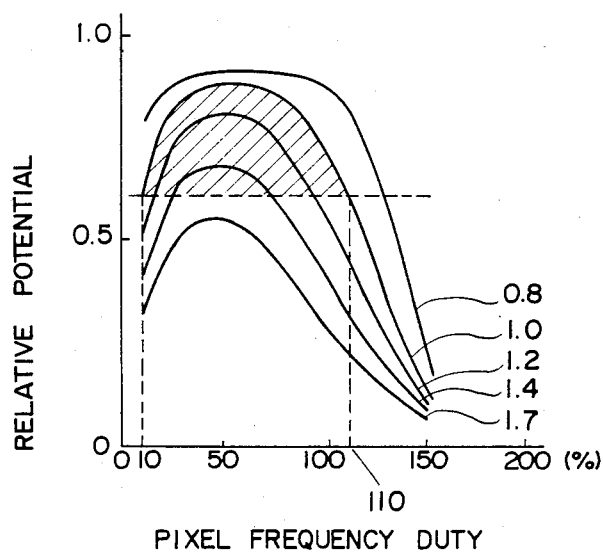
FIG. 4 is a graph showing a relationship between a relative potential difference and a pixel frequency duty associated with a pattern which was exposed at every two pixels in the main scan direction.

As shown in FIG. 4, the ratios shown in FIG. 2 may be represented in relation to the pixel frequency duties employing the relative beam diameter as a parameter. In this instance, it is known by experience that a relative potential higher than about 0.6 is desirable. This, coupled with the previously mentioned beam diameter to pixel pitch ratio which is larger than about 1.0, provides an adequate pixel frequency range as indicated by hatching in FIG. 4.

Figure 5:
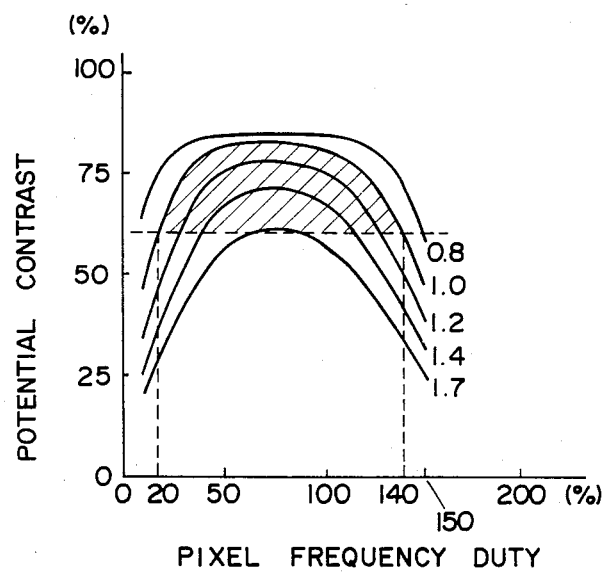
FIG. 5 is a graph showing a relationship between a potential contrast and a pixel frequency duty.

In FIG. 5, there is shown a relationship between a potential contrast and a pixel frequency duty with respect to the various relative beam diameters. In this case, experience teaches that the potential contrast is desirable if higher than about 60%. Such a desirable range of potential contrast and the previously stated relative beam diameters provide an adequate pixel frequency duty range as indicated by hatching in FIG. 5.

Therefore, considering conditions essential for recording, i.e., that the potential contast and potential difference of latent images be large and, in addition, the exposure potential be kept low and stable, the relationships shown in FIGS. 4 and 5 teach that the optimum range of pixel frequency duty is 20–110%.

Thus, in this particular embodiment, scanning by the light beam is effected such that, assuming that the ratio of the light beam exposure time to the one-pixel scanning time is Td, it satisfies a predetermined condition at, in particular, the boundaries between image and non-image portions, as shown below:

$$0.2 \leq Td \leq 1.1$$

If the pulse width of binary video data is selected within the adequate pixel frequency range as described above, images will be recorded with high contrast and resolution, whether the recording mode be positive-to-positive or negative-to-positive. In addition, the areas of image and non-image portions become similar to those of video data so that various factors detrimental to sharpness, such as thickening and thinning of lines, are effectively reduced. Experimentarily, in positive-to-positive recording, the best images were achieved at the developing level of 150 V and in the pixel frequency duty range of 60–70%.

In the foregoing description, attention has been paid exclusively to pixel frequency duty which greatly effects recording quality. However, because various other factors such as scanning rate, beam power and developing devel have influence on recording quality, they also have to be taken into consideration in selecting an optimum pixel frequency duty so that the quality of recorded images may be further enhanced.

The method in accordance with the illustrative embodiment may be practiced with any of various means which will not be shown or described. In any case, it can readily be practiced by modifying the ratio of an exposure time to a one-pixel scanning time at a boundary between image and non-image portions, or pulse width of binary video data, in response to binary video data.

As described above, the image recording method in accordance with the first embodiment varies the pulse width of binary video data within an adequate pixel frequency duty range at a boundary between image and non-image portions, thereby increasing the latent image potential in the image portion. This allows an optical scan type electrophotographic recording apparatus to record images with a high resolution.

Hereinafter will be described a second embodiment of the present invention elaborated to achieve the second object.

The method in accordance with the second embodiment is applicable to an optical scan type electrophotographic recording apparatus which uses minute light emitting segments such as phosphors or light emitting diodes (LEDs), modifies light emanating therefrom by binary video data, scans a photoconductive element with the modulated light to form an electrostatic latent image thereon, and turns the latent image to a visible image. The method is implemented by means which is capable of varying the pulse width of video data which modulate light emanating from the light-emitting elements. The pulse width of video data is varied such that the ratio of an exposing time to a one-pixel scanning time satisfies a given condition which will be described at boundaries between image and non-image portions, thereby increasing the latent image potential in image portions adjacent to non-image portions.

In this particular embodiment, in recording images by such an optical scan type electrophotographic recording apparatus as one shown in FIG. 6, generally 30, an optimum exposure condition is provided which is such that the pulse width of binary video data for modulating light output from minute light emitting segments is varied to enhance the latent image potential difference at a border between image and non-image portions and, thereby, electrostatic contrast, thereby recording images with a high resolution.

In the recording apparatus 30 shown in FIG. 6, phosphor elements arranged in lines in a phosphor dot array 34 pixel by pixel in the main scan direction are turned on and off by binary data 32 to produce directly modulated fine beams. The beams are routed through an optical imaging system 36 to illuminate in the main scan direction a drum-like photoconductive element 40 which is fed in a subscan direction and deposited with a uniform charge by a charger 38, thereby sequentially exposing the drum surface line by line. A latent image resulting from the exposure is turned to a visible image by a developing unit 42 and, then, transferred to a paper 46 by a transfer unit 44. The reference numeral 48 in FIG. 6 designates a cleaner for removing residual toner particles from the drum surface after the transfer.

Referring to FIG. 7, a specific construction of the phosphor dot array 34 is shown which comprises an array of phosphor elements 52 arranged in a face glass 50 pixel by pixel, and drive integrated circuits (ICs) 54 built in a single substrate 58 integrally with terminals 56. The phosphor dot aray 34 serving as a light source may be replaced by an array of LEDs each constituting a pixel.

The various plots shown in FIGS. 2-4 and discussed in relation with the first embodiment are directly applicable to the second embodiment as well.

Therefore, considering conditions essential for recording, i.e., that the potential contrast and potential difference of latent images be large and, in addition, the exposure potential be kept low and stable, the relationships shown in FIGS. 4 and 5 teach that the optimum range of pixel frequency duty is 20-110%.

Thus, in accordance with this particular embodiment, the pulse width of video data is varied such that, assuming that the ratio of an exposure time to a one-pixel scanning time is Td, it satisfies a predetermined condition at, in particular, the boundaries between image and non-image portions, as shown below:

$$0.2 \leq Td \leq 1.1$$

As described above, the image recording method in accordance with the second embodiment varies the pulse width of binary video data within an adequate pixel frequency duty range at a boundary between image and non-image portions, thereby increasing the latent image potential in the image portion and, thereby, the electrostatic contrast. This allows an optical scan type electrophotographic recording apparatus, especially one which uses miniature light-emitting segments as a light source, to record images with a high resolution.

A third embodiment contemplated to achieve the third object of the present invention will be described.

Where an optical scan type electrophotographic recording apparatus such as one shown in FIG. 1 is constructed to electrostatically form a latent image on a photoconductive element by exposing it to a light beam modulated by binary video data, the method in accordance with the third embodiment sets up a light beam condition and a light beam scanning condition which makes the pixels in an image to be developed have the same diameter both in the main scan and subscan directions.

Referring to FIGS. 8A, 8B, 9A, 9B, 10A and 10B, there are shown examples of relative potentials V and relative exposure energy Q in relation to relative distances X and Y in the main scan and subscan directions in an exposure pattern which comprises one line in each of the main scan and subscan directions, provided by varying the light beam condition and the light beam scanning condition in various ways. The relative distance X or Y represents a ratio of distance to each pixel pitch in the main scan or subscan direction, the relative potential V a ratio of a surface potential on the drum 22 after exposure to a surface potential (uniform) associated with zero exposure energy, and the relative exposure energy Q the ratio of actual exposure energy to maximum exposure energy. For illustration, FIGS. 8B, 9B and 10B share the same data.

Figure 8A:
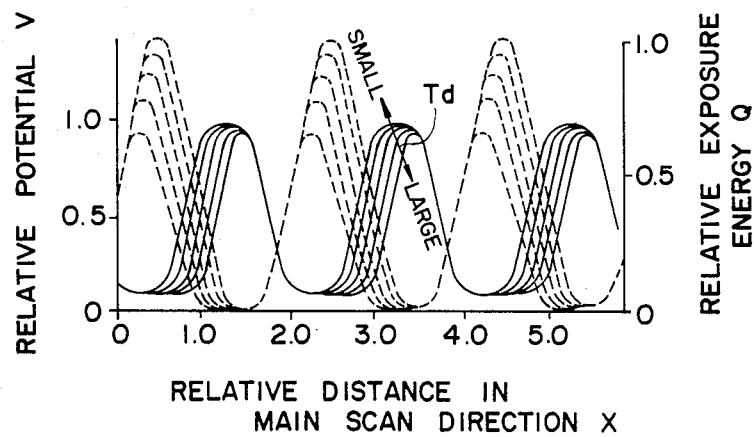
FIGS. 8A and 8B are graphs showing relative potentials with respect to a relative distance in the subscan direction and that in the main scan direction provided by $\rho_x$ of about 0.94 in accordance with the third embodiment.
Figure 8B:
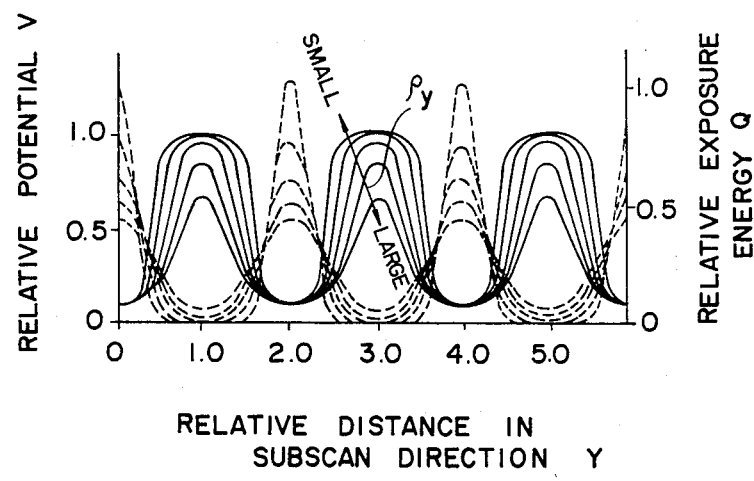

The curves shown in FIGS. 8A and 8B were provided by a ratio $\rho_x$ of a beam diameter in the main scan direction to a pixel pitch in the main scan direction which was about 0.94. In FIG. 8A, the frequency duty Td which is the ratio of an optical beam exposure time to a one-pixel scanning time is varied while, in FIG. 8B, a ratio $\rho_y$ of a beam diameter in the subscan direction to a pixel pitch in the subscan direction. The characteristics indicated by bold lines are associated with a condition wherein the potential distribution is analogous in both the main scan and subscan directions and, in such a condition, there are provided $\rho_x = 0.94$, $\rho_y = 1.18$ and Td = 0.6 and, thereby, a light beam condition $\rho_y/\rho_x = 1.255$ and a light beam scanning condition $\rho_x \cdot Td = 0.564$. The "beam diameter" referred to is defined by a sectional shape in a position which is $e^{-2}$ (about 13.5%) of a peak of a beam intensity distribution having a Gaussian distribution.

Figure 9A:
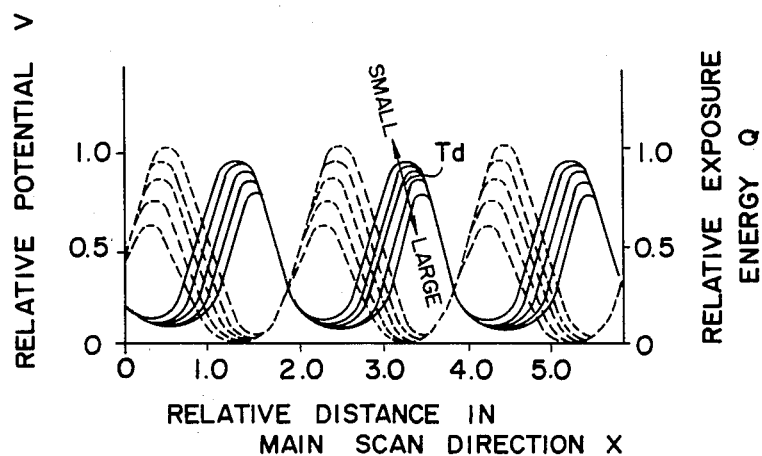
FIGS. 9A and 9B are graphs showing relative potentials with respect to a relative distance in the subscan direction and that in the main scan direction provided by $\rho_x$ of about 1.18.
Figure 9B:
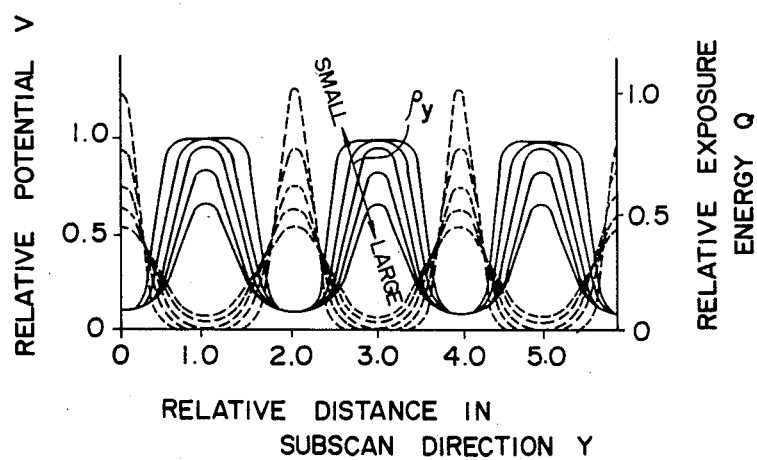

The curves shown in FIGS. 9A and 9B resulted from a ratio $\rho_x$ of the beam diameter in the main scan direction to the pixel pitch in the main scan direction which was about 1.18. In FIG. 9A, the frequency duty Td which is the ratio of a light beam exposing time to a one-pixel scanning time is varied while, in FIG. 9B, the ratio $\rho_y$ of a beam diameter in the subscan direction to a pixel pitch in the subscan direction is varied. The characteristics indicated by bold lines are associated with a condition wherein the potential distribution in the main scan direction is analogous to that in the subscan direction and, in such a condition, there are provided $\rho_x = 1.18$, $\rho_y = 1.42$ and Td = 0.7 and, thereby, a light beam condition $\rho_y/\rho_x = 1.203$ and a light beam scanning condition $\rho_x \cdot Td = 0.826$.

Figure 10A:
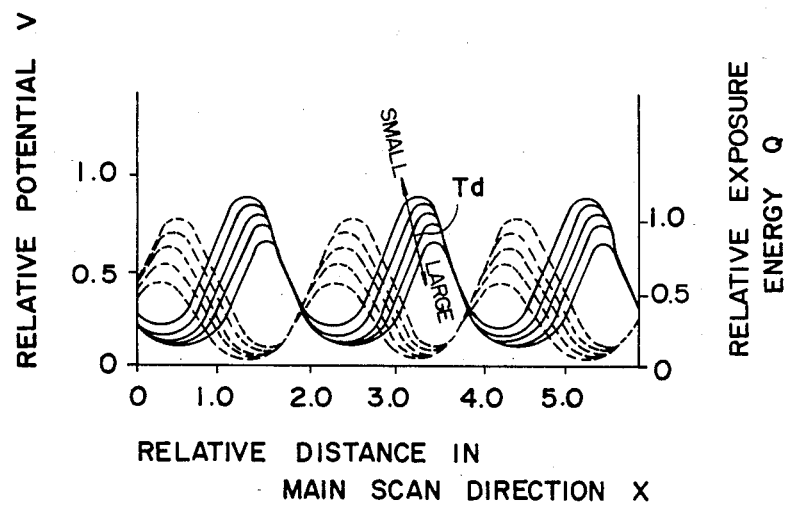
FIGS. 10A and 10B are graphs showing relative potentials with respect to a relative distance in the subscan direction and that in the main scan direction provided by $\rho_x$ of about 1.42.
Figure 10B:
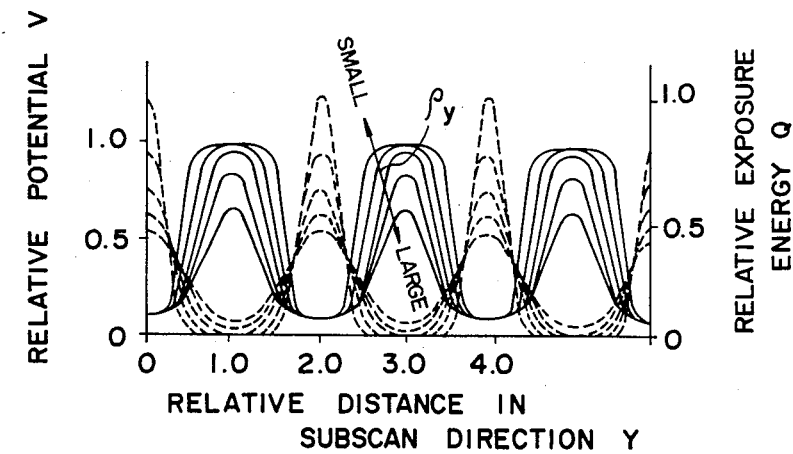

The curves shown in FIGS. 10A and 10B resulted from a ratio $\rho_x$ of the beam diameter in the main scan direction to the pixel pitch in the main scan direction which was about 1.42. In FIG. 10A, the frequency duty Td which is the ratio of a light beam exposing time to a one-pixel scanning time is varied while, in FIG. 10B, the ratio $\rho_y$ of a beam diameter in the subscan direction to a pixel pitch in the subscan direction is varied. The characteristics indicated by bold lines are associated with a condition wherein the potential distribution in the main scan direction is analogous to that in the subscan direction and, in such a condition, there are provided $\rho_x = 1.42$, $\rho_y = 1.65$ and Td = 0.8 and, thereby, a light beam condition $\rho_y/\rho_x = 1.162$ and a light beam scanning condition $\rho_x \cdot Td = 1.136$.

By selecting other suitable values of $\rho_x$ to provide other various parameters $\rho_y$ and Td, potential distributions which are analogous in the main scan and subscan directions will be obtained.

It will be understood from the above analysis and by experience that if $1.0 < \rho_y/\rho_x < 1.5$ and $0.5 < \rho_x \cdot Td < 1.5$ are satisfied, a potential distribution substantially analogous in the main scan and subscan directions in practice is achievable.

Figure 11:
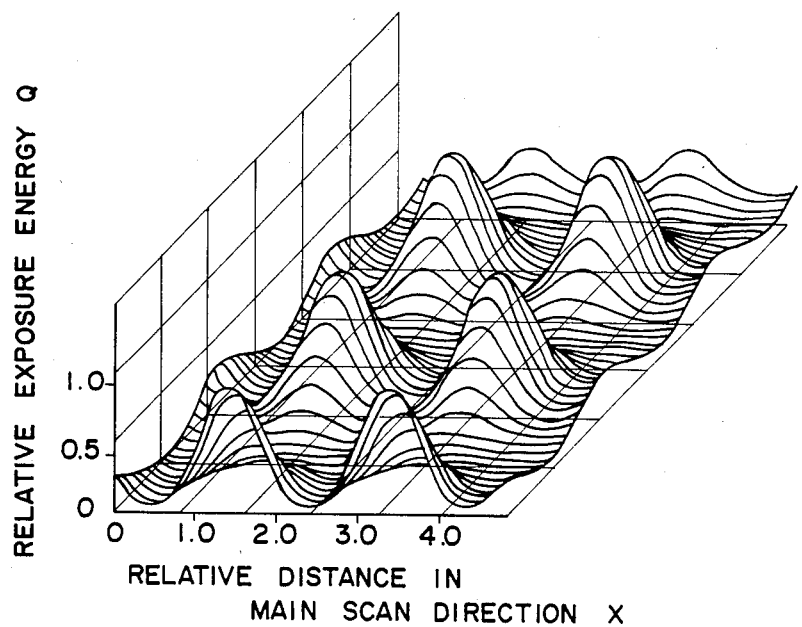
FIG. 11 is a two-dimensional view of exposure energy distribution resulted when a pixel-by-pixel grid pattern was drawn.
Figure 12:
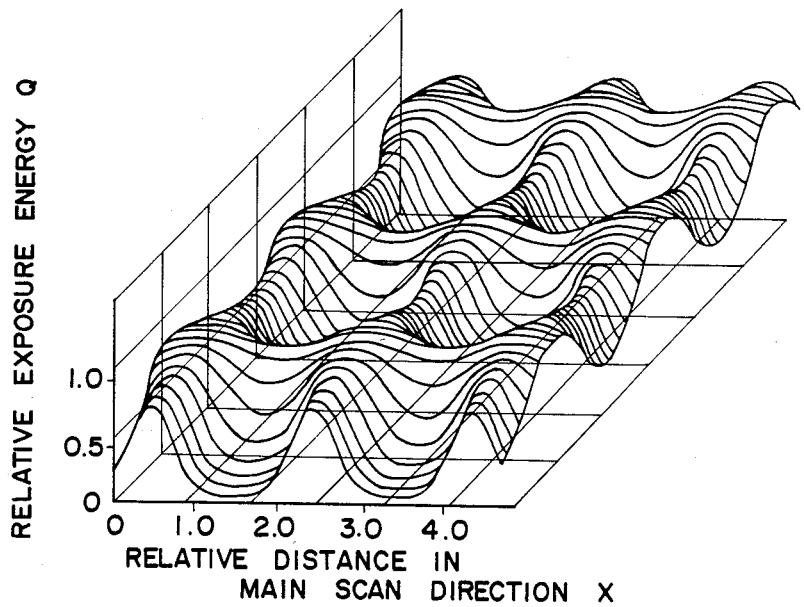
FIG. 12 is a view of surface potential distribution on a photoconductive element associated with FIG. 11.

Referring to FIGS. 11 and 12, a two-dimensional distribution is shown which is associated with one of the various conditions discussed hereinabove. FIG. 11 represents a distribution of exposure energy Q provided when a grid pattern is drawn pixel by pixel under the conditions $\rho_x = 1.18$, $\rho_y = 1.42$ and Td = 0.7. FIG. 12 shows a surface potential distribution on a photoconductive element associated with the exposure energy distribution of FIG. 11. Although the graphs of FIGS. 11 and 12 are the results of computer simulation, it has been provided by experiments that when a latent image is formed on a photoconductive element under the above conditions and then turned to a visible image, lines of the resulting grid are substantially identical in width in the main scan and subscan directions.

As described above, in accordance with the method of the third embodiment, where an optical scan type electrophotographic recording apparatus is operated to record an image, a latent image associated with binary video data is formed electrostatically on a photoconductive element under a particular light beam condition and a particular light beam scanning condition which provide a potential distribution analogous in the main scan and subscan directions. The method, therefore, allows images to be recorded always with a high resolution and with the same pixel diameter in the main scan and subscan directions.

As described above, in accordance with the method of the third embodiment, when an optical scan type electrophotographic recording apparatus is operated to record an image, a latent image associated with binary video data is formed electrostatically on a photoconductive element under a particular light beam condition and a particular light beam scanning condition which provide a potential distribution analogous in the main scan and subscan directions. The method, therefore, allows images to be recorded always with a desirable resolution and with an equal diameter both in the main scan and subscan directions.

Basically, the pixel diameters in the main scan and subscan directions can be controlled if $\rho_x$, $\rho_y$ and Td are determined at the step of forming a latent image on a photoconductive element. This particular embodiment, which provides a potential distribution analogous in the main scan and subscan directions, is effectively applicable to both positive-to-positive recording and negative-to-negative recording.

The third embodiment described has concentrated to a light beam condition and a light beam scanning condition. However, because the quality of recorded images also depends upon other various factors such as scanning rate, beam power and developing level, such various factors need also be taken into account in the selection of $\rho_y/\rho_x$ and $\rho_x \cdot Td$ if higher quality images are desired. The control over Td is readily practicable by modifying the pulse width of binary video data at boundries between image and non-image portions.

As described above, the method in accordance with the third embodiment sets up a particular light beam condition and a particular light beam scanning condition which make each pixel recorded by an optical scan type electrophotographic recording apparatus identical in diameter in the main scan and subscan directions, thereby allowing images to be recorded with an excellent resolution.

A fourth embodiment of the present invention directed to achieving the fourth object will be described.

The method in accordance with the fourth embodiment is applicable to, for example, the optical scan type electrophotographic recording apparatus 30 shown in FIGS. 6 and 7 which is of the type using, as a light source, the phosphor dot array tube 34 having phosphor elements arranged in an array in the main scan direction on a pixel basis. When a light beam modulated by binary video data 32 and output from the dot array tube 34 is to be focused onto the surface of the photoconductive element 40, which is fed in the subscan direction, the method of the fourth embodiment provides a specific light beam condition and a specific light beam scanning condition which makes the pixels in the resulting image equal in diameter in the main scan and subscan directions.

Referring to FIGS. 13A, 13B, 14A, 14B, 15A and 15B, there are shown examples of relative potentials V and relative exposure energy Q in relation to relative distances X and Y in the main scan and subscan directions in an exposure pattern which comprises one line in each of the main scan and subscan directions, provided by varying the light beam condition and the light beam scanning condition in various ways. The relative distance X or Y represents a ratio of a distance to each pixel pitch in the main scan or subscan direction, the relative potential V a ratio of a surface potential on the drum after exposure to a surface potential (uniform) associated with zero exposure energy, and the relative exposure energy Q a ratio of actual exposure energy to maximum exposure energy. Here, FIGS. 13A, 14A and 15A share the same data for illustration purpose.

Figure 13A:
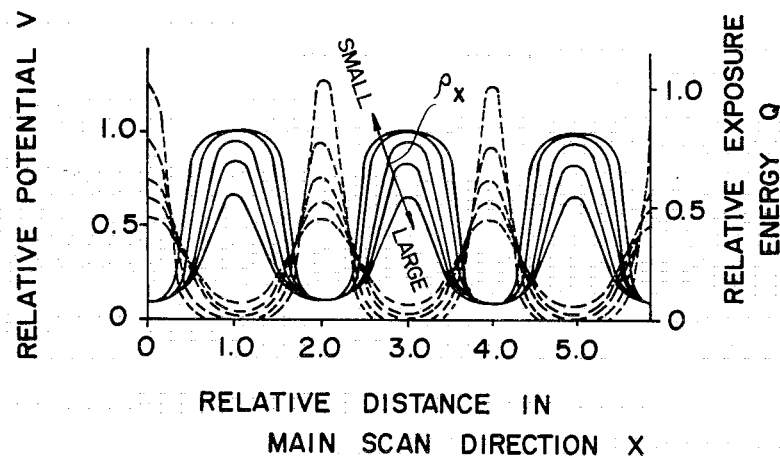
FIGS. 13A and 13B are graphs showing relative pontentials with respect to a relative distance in the main scan direction and a relative distance in the subscan direction provided by $\rho_y$ of about 0.94.
Figure 13B:
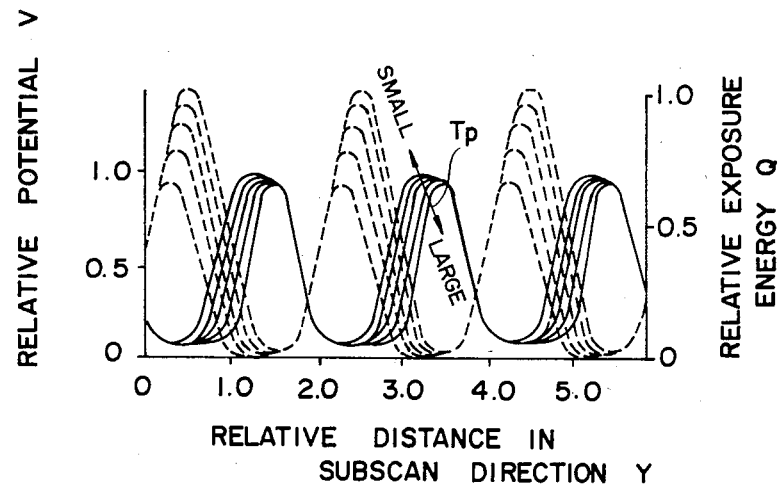

The curves shown in FIGS. 13A and 13B were provided by a ratio $\rho_y$ of a beam diameter in the subscan direction to a pixel pitch in the main scan direction which was about 0.94. In FIG. 13A, the ratio $\rho_x$ of a beam diameter in the main scan direction to a pixel pitch in the main scan direction is varied while, in FIG. 13B, the ratio Tp of a light beam exposing time to a one-pixel scanning time is varied. The characteristics indicated by bold lines are associated with a condition wherein the potential distribution is analogous in the main scan and subscan directions and, in such a condition, there are provided $\rho_y \approx 0.94$, $\rho_x \approx 1.18$ and Tp$\approx$0.6 and, thereby, a light beam condition $\rho_y/\rho_x \approx 0.797$ and a light beam scanning condition $\rho_y \cdot \text{Tp} \approx 0.564$. The "beam diameter" referred to is defined by a sectional shape in a position which is $e^{-2}$ (about 13.5%) of a peak of a beam intensity distribution having a Gaussian distribution.

Figure 14A:
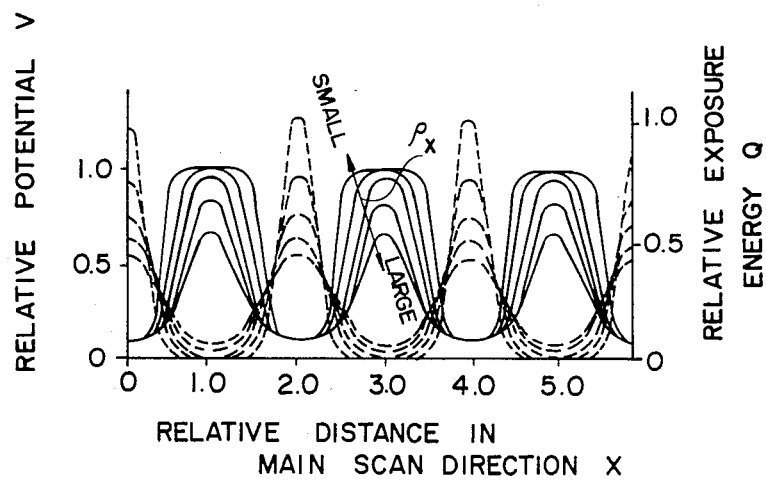
FIGS. 14A and 14B are graphs showing relative potentials with respect to a relative distance in the main scan direction and that in the subscan direction provided by $\rho_y$ of about 1.18.
Figure 14B:
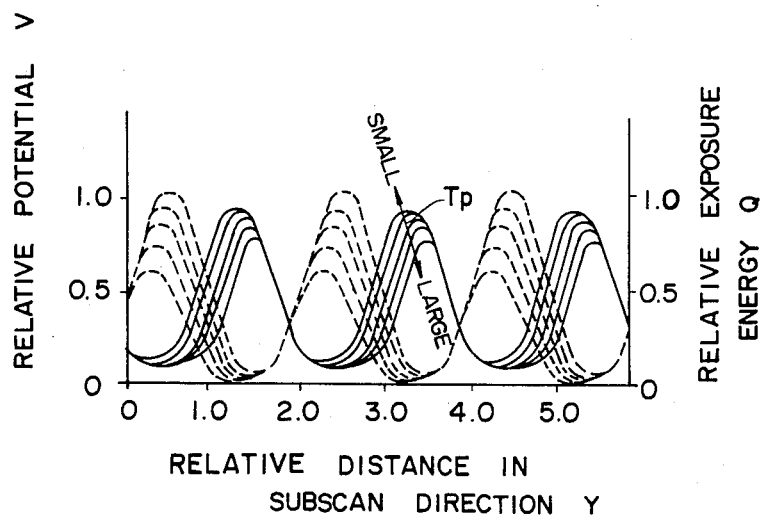

The curves shown in FIGS. 14A and 14B resulted from a ratio $\rho_y$ of a beam diameter in the subscan direction to a pixel pitch in the subscan direction which was about 1.18. In FIG. 14A, the ratio $\rho_x$ of a beam diameter in the main scan direction to a pixel pitch in the main scan direction is varied while, in FIG. 14B, the ratio Tp of a light beam exposing time to a one-pixel scanning time is varied. The characteristics indicated by bold lines are associated with a condition wherein the potential distribution is analogous in the main scan and subscan directions and, in such a condition, there are provided $\rho_y \approx 1.18$, $\rho_x \approx 1.42$ and Tp$\approx$0.7 and, thereby, a light beam condition $\rho_y/\rho_x \approx 0.831$ and a light beam scanning condition $\rho_y \cdot \text{Tp} \approx 0.826$.

Figure 15A:
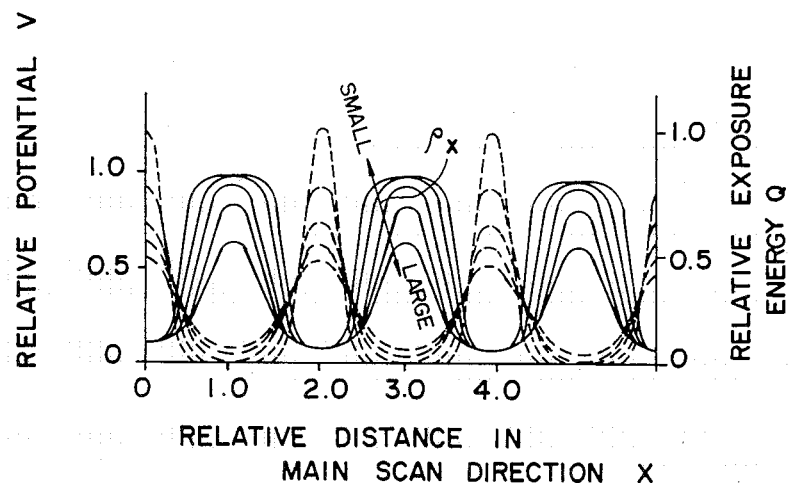
FIGS. 15A and 15B are graphs showing relative potentials with respect to a relative distance in the main scan direction and that in the subscan direction provided by $\rho_y$ of about 1.42.
Figure 15B:
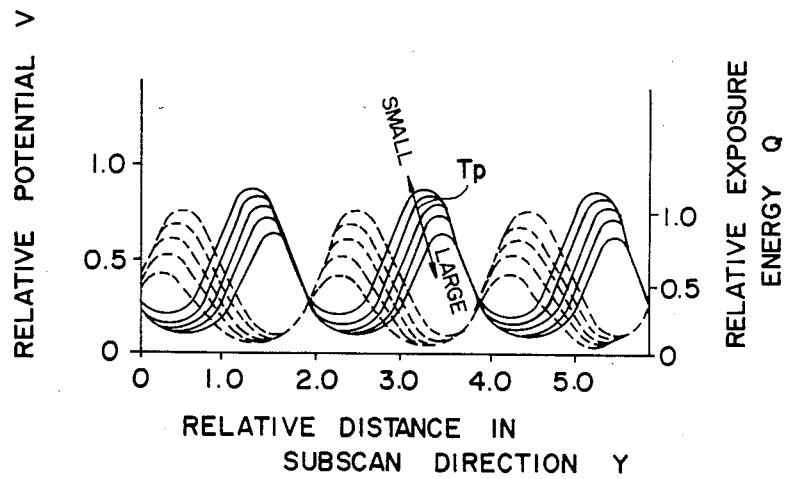

The curves shown in FIGS. 15A and 15B resulted from a ratio $\rho_y$ of a beam diameter in the subscan direction to a pixel pitch in the subscan direction which was about 1.42. In FIG. 15A, the ratio $\rho_x$ of a beam diameter in the main scan direction to a pixel pitch in the main scan direction is varied while, in FIG. 15B, the ratio Tp of a light beam scanning time to a one-pixel scanning time is varied. The characteristics indicated by bold lines are associated with a condition wherein the potential distribution is analogous in the main and subscan directions and, in such a condition, there are provided $\rho_y \approx 1.42$, $\rho_x \approx 1.65$ and Tp=0.8 and, thereby, a light beam condition $\rho_y/\rho_x \approx 0.861$ and a light beam scanning condition $\rho_y \cdot \text{Tp} \approx 1.136$.

By selecting other suitable values of $\rho_y$ to provide other various parameters $\rho_x$ and Tp, potential distributions which are analogous in the main scan and subscan directions will be obtained.

It will be understood from the above analysis and by experience that if $0.6 \leq \rho_y/\rho_x \leq 1.0$ and $0.5 \leq \rho_y \cdot \text{Tp} \leq 1.5$ are satisfied, a potential distribution substantially analogous in the main scan and subscan directions in practice is achievable.

Figure 16:
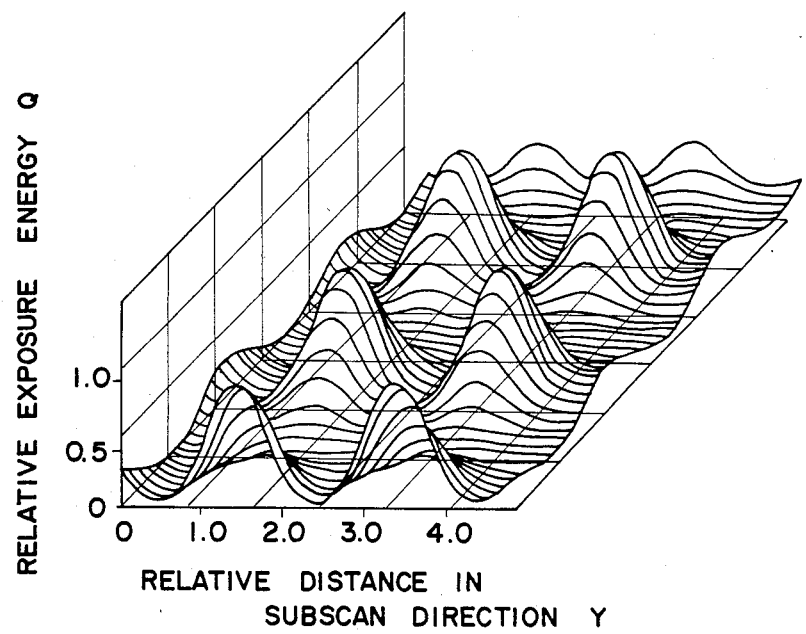
FIG. 16 is a two-dimensional view of exposure energy distribution resulted when a pixel-by-pixel grid pattern was drawn.
Figure 17:
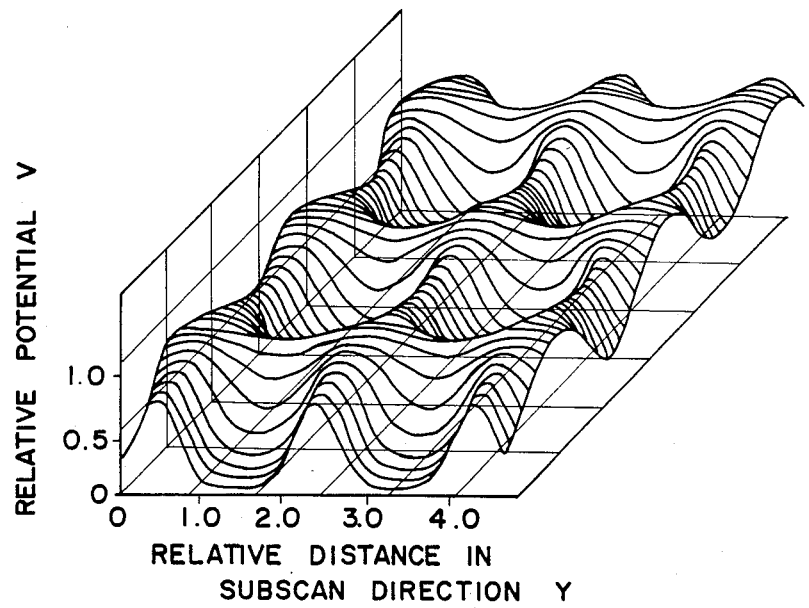
FIG. 17 is a view of surface potential distribution on a photoconductive element associated with FIG. 16

Referring to FIGS. 16 and 17, a two-dimensional distribution is shown which is associated with one of the various conditions discussed hereinabove. FIG. 16 represents a distribution of exposure energy Q provided when a grid pattern is drawn pixel by pixel under the conditions $\rho_y \simeq 1.18$, $\rho_x \simeq 1.42$ and $Tp \simeq 0.7$. FIG. 17 shows a surface potential distribution on a photoconductive element associated with the exposure energy distribution of FIG. 16. Although the graphs of FIGS. 16 and 17 are the results of computer simulation, it has been proved by experiments that when a latent image is formed on a photoconductive element under the above conditions and then turned to a visible image, lines of the resulting grid are substantially identical in width in the main scan and subscan directions.

As described above, in accordance with the method of the fourth embodiment, when an optical scan type electrophotographic recording apparatus is operated to record an image, a latent image associated with binary video data is formed electrostatically on a photoconductive element under a particular light beam condition and a particular light beam scanning condition which provide a potential distribution analogous in the main scan and subscan directions. The method, therefore, allows images to be recorded always with a desirable resolution and with the same pixel diameter in the main scan and subscan directions.

Basically, the pixel diameters in the main scan and subscan directions can be controlled if $\rho_x$, $\rho_y$ and Tp are determined at the step of forming a latent image on a photoconductive element. This particular embodiment, which provides a potential distribution analogous in the main scan and subscan directions, is effective applicable to both positive-to-positive recording and negative-to-negative recording.

The third embodiment described has concentrated to a light beam condition and a light beam scanning condition. However, because the quality of recorded images also depends upon other various factors such as scanning rate, beam power and developing level, such various factors need also be taken into account in the selection of $\rho_y/\rho_x$ and $\rho_y \cdot Tp$ if higher quality images are desired.

The control over Td is readily practicable by modifying the pulse width of binary video data at boundaries between image and non-image portions.

As described above, the method in accordance with the third embodiment sets up a particular light beam condition and a particular light beam scanning condition which make each pixel recorded by an optical scan type electrophotographic recording apparatus, particularly one which uses minute light emitting segments as a light source, identical in diameter in the main scan and subscan directions, thereby allowing images to be recorded with an excellent resolution.

A fifth embodiment of the present invention elaborated to achieve the fifth object will be described.

Where an optical scan type electrophotographic recording apparatus such as one 10 shown in FIGS. 1 is constructed to electrostatically form a latent image on the drum 22 by exposing it to a light beam modulated by binary video data, the method in accordance with the fifth embodiment sets up a particular light beam condition which confines the ratio between a width lp of a latent image line substantially parallel to the developing direction and a width lc of the same substantially perpendicular to the developing direction to an optimum range of $1.0 \leq lc/lp \leq 1.2$.

Referring to FIGS. 18A, 18B, 19A, 19B, 20A and 20B, there are shown examples of relative potentials V and relative exposure energy Q in relation to relative distances X and Y in the main scan and subscan directions in an exposure pattern which comprises one line in each of the main scan and subscan directions, provided by varying the light beam condition and the light beam scanning condition in positive-to-positive recording in various ways. The relative distance X or Y represents a ratio of a distance to each pixel pitch in the main scan or subscan direction, the relative potential V a ratio of a surface potential on the drum 22 after exposure to a surface potential (uniform) associated with zero exposure energy, and the relative exposure energy Q a ratio of actual exposure energy to maximum exposure energy.

Figure 18A:
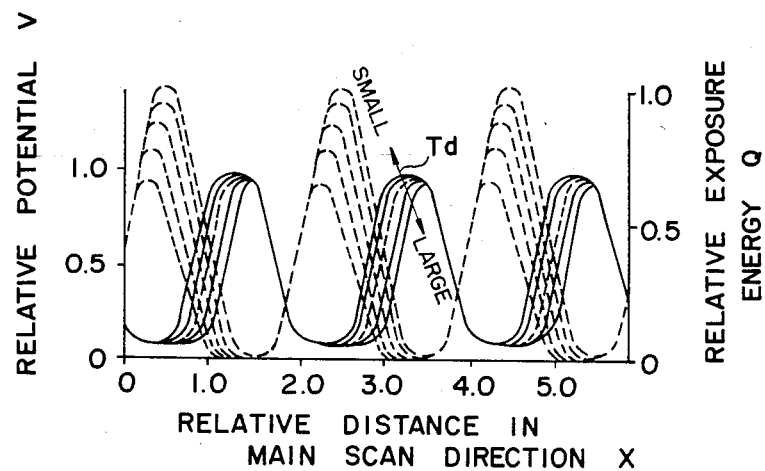
FIGS. 18A and 18B are graphs showing relative potentials with respect to a relative distance in the subscan direction and that in the main scan direction provided by $p_x$ of about 0.94 in accordance with the fifth embodiment of he present invention.
Figure 18B:
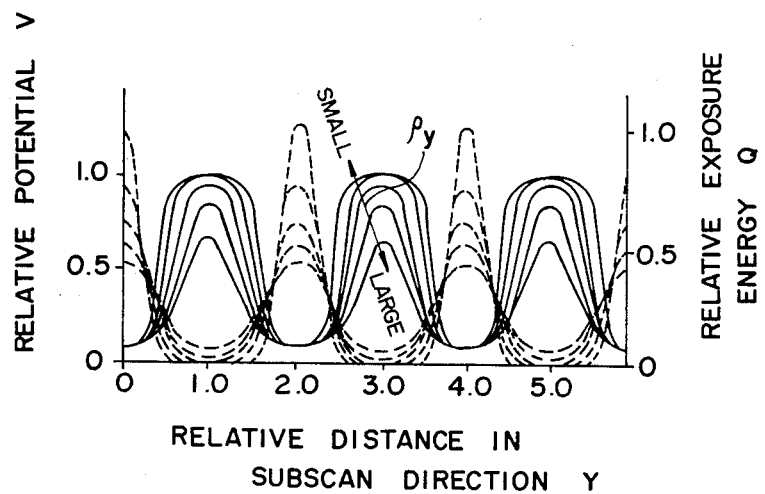

The curves shown in FIGS. 18A and 18B were provided by a ratio $\rho_x$ of a beam diameter in the main scan direction to a pixel pitch in the main scan direction which was about 0.94. In FIG. 18A, the pixel frequency duty Td which is the ratio of an optical beam exposing time to a one-pixel scanning time is varied while, in FIG. 18B, the ratio $\rho_y$ of a beam diameter in the subscan direction to a pixel pitch in the subscan direction is varied. The characteristic indicated by a dotted line in FIG. 18A and one indicated by a bold line in FIG. 18B share substantially the same potential distribution and, in such a condition, there are provided $\rho_x \simeq 0.94$, $\rho_y \simeq 1.18$ and $Td \simeq 0.6$. In this case, by changing the pixel frequency duty Td from 0.6 to 0.7 as indicated by a bold line in FIG. 18A, the latent image line width lc in the subscan direction can be made greater than one in the main scan direction and the ratio lc/lp can be confined to the previously mentioned range.

Figure 19A:
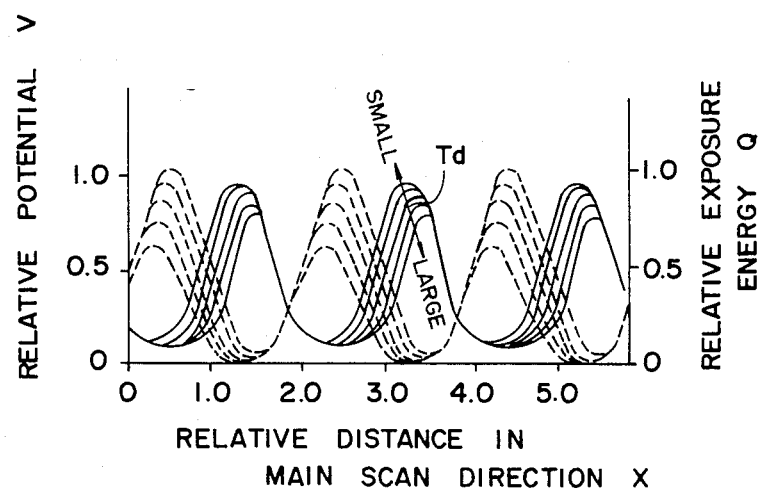
FIGS. 19A and 19B are graphs showing relative potentials with respect to a relative distance in the subscan direction and that in the main scan direction provided by $p_x$ of about 1.18.
Figure 19B:
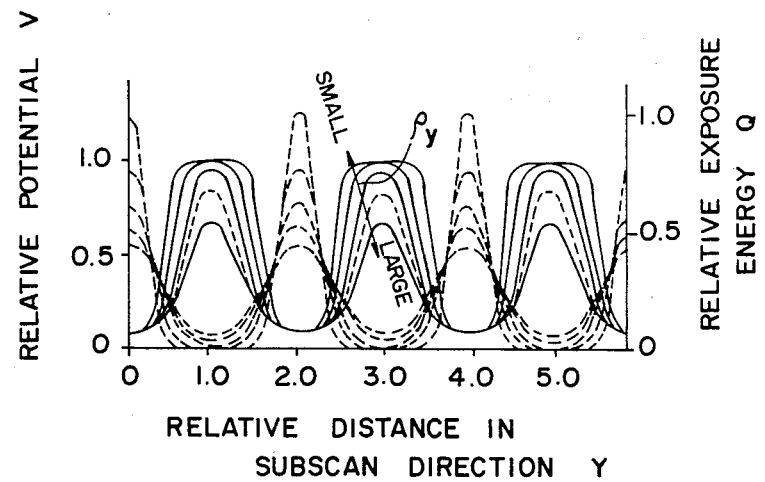

The curves shown in FIGS. 19A and 19B resulted from a ratio $\rho_x$ of a beam diameter in the main scan direction to a pixel pitch in the main scan direction which was about 1.18. In FIG. 19A, the ratio Td of a light beam exposing time to a one-pixel scanning time is varied while, in FIG. 19B, the ratio $\rho_y$ of a beam diameter in the subscan direction to a pixel pitch in the subscan direction is varied. The characteristic indicated by a bold line in FIG. 19A and one indicated by a dotted line in FIG. 19B share substantially the same potential distribution and, in such a condition, there are provided $\rho_x \simeq 1.18$, $\rho_y \simeq 1.42$ and $Td \simeq 0.7$. In This case, by changing the ratio of $\rho_y$ of a beam diameter in the subscan direction to a pixel pitch in the subscan direction from 1.42 to 1.30 as represented by a bold line in FIG. 19B, the latent image line width lc in the subscan direction can be made greater than one in the main scan direction and the ratio lc/lp can be confined to the previously mentioned range.

Figure 20A:
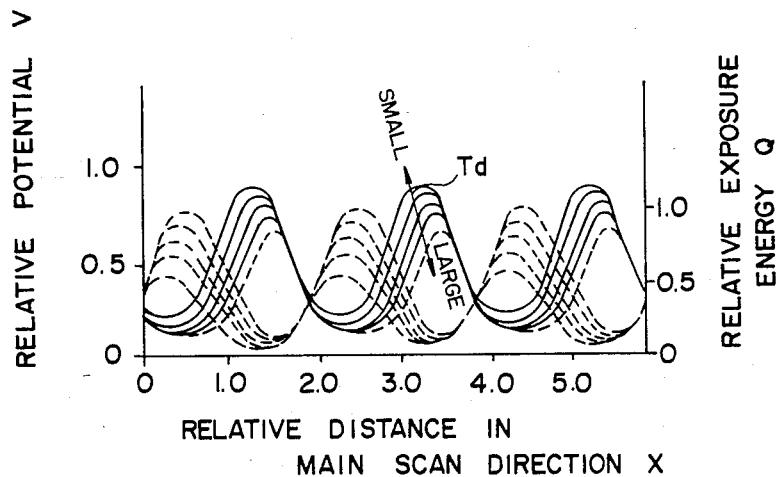
FIGS. 20A and 20B are graphs showing relative potentials with respect to a relative distance in the subscan direction and that in the main scan direction provided by $p_x$ of about 1.42.
Figure 20B:
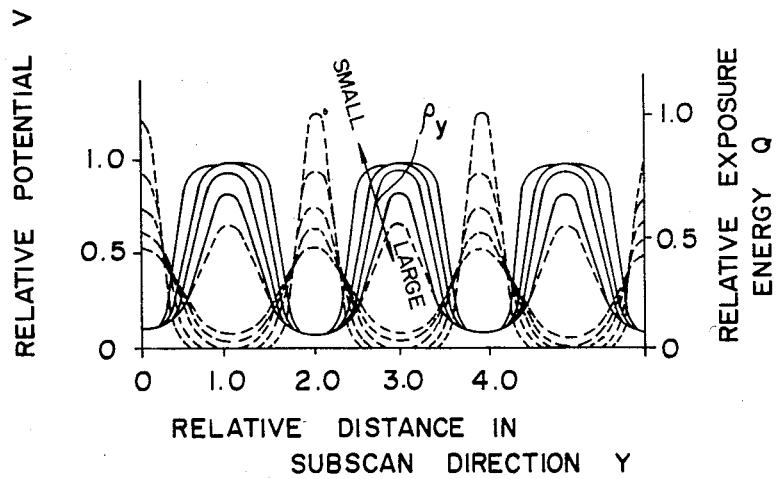

The curves shown in FIGS. 20A and 20B resulted from a ratio $\rho_x$ of a beam diameter in the main scan direction to a pixel pitch in the main scan direction which was about 1.42. In FIG. 20A, the ratio Td of a light beam exposing time to a one-pixel scanning time is varied while, in FIG. 20B, the ratio $\rho_y$ of a beam diameter in the subscan direction to a pixel pitch in the subscan direction is varied. The characteristics indicated by dotted lines in FIGS. 20A and 20B share substantially the same potential distribution and, in such a condition, there are provided $\rho_x \simeq 1.42$, $\rho_y \simeq 1.65$ and $Td \simeq 0.8$. In this case, by changing the ratio $\rho_y$ of a beam diameter in the subscan direction to a pixel pitch in the subscan direction from 1.65 to 1.42 as indicated by a bold line in FIG. 20B and the pixel frequency duty Td from 0.8 to 0.7 as indicated by a bold line in FIG. 20A, the latent image line width lc in the subscan direction can be made greater than one in the main scan direction and the ratio lc/lp can satisfy the condition concerned.

Further, if $\rho_x$ is suitably varied so that, in the manner descried, the ratio $\rho_y$ of a beam diameter in the subscan direction to a pixel pitch in the subscan direction and/or the pixel frequency duty Td associated with a potential distribution which is substantially identical in the main scan and subscan directions is varied, the ratio lc/lp will satisfy the same condition.

Figure 21A:
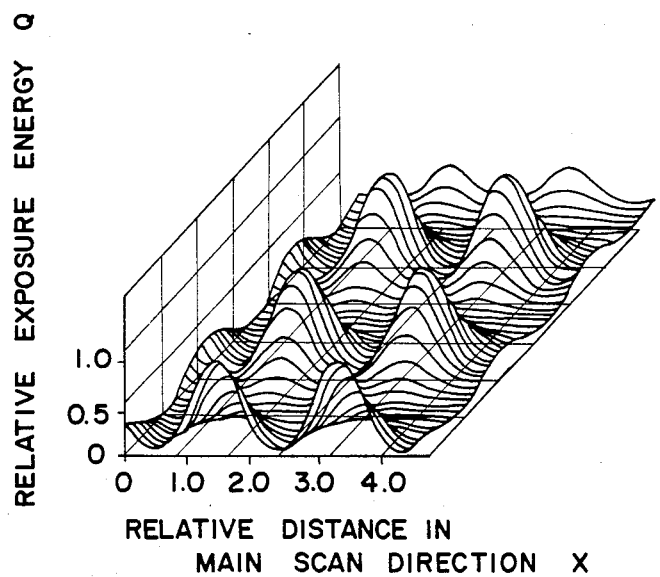
FIGS. 21A-21C show respectively a distribution of relative exposure energy Q as viewed in the main scan direction, a distribution of relative potentials as viewed in the main scan direction, and a distribution of relative potentials as viewed in the subscan direction, each being associated with a case wherein a potential distribution provided by drawing a pixel-by-pixel grid pattern is substantially equal in both the main and subscan directions.
Figure 21B:
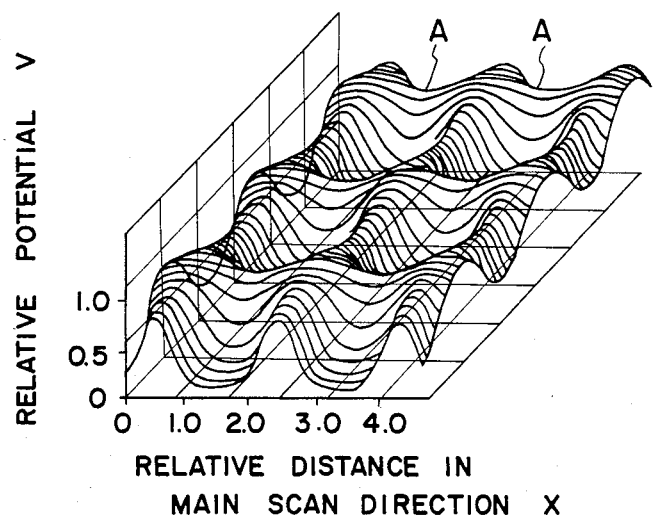
Figure 21C:
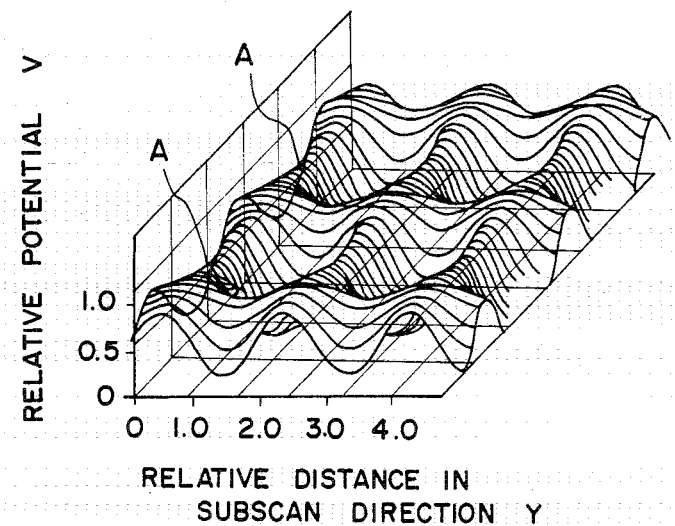
Figure 22A:
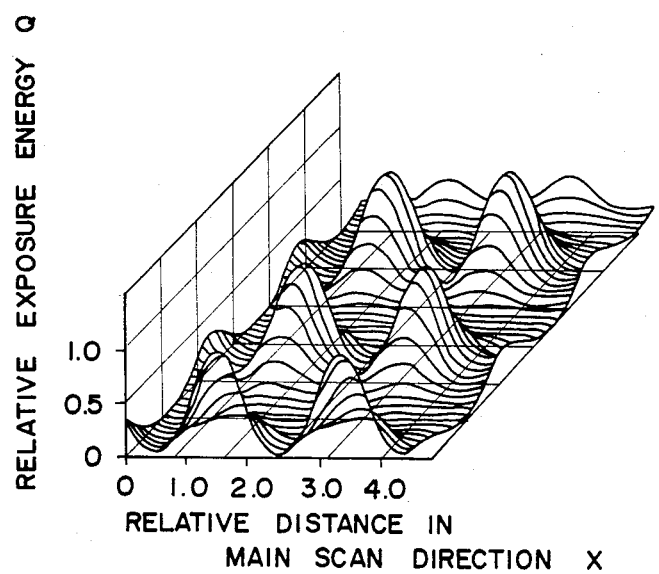
FIGS. 22A-22C show respectively a distribution of relative exposure energy Q as viewed in the main scan direction, a distribution of relative potentials as viewed in the main scan direction, and a distribution of relative potentials as viewed in the subscan direction, each being associated with a case wherein a ratio between latent image line widths provided by drawing a pixel-by-pixel grid pattern satisfies a condition in accordance with the present invention.
Figure 22B:
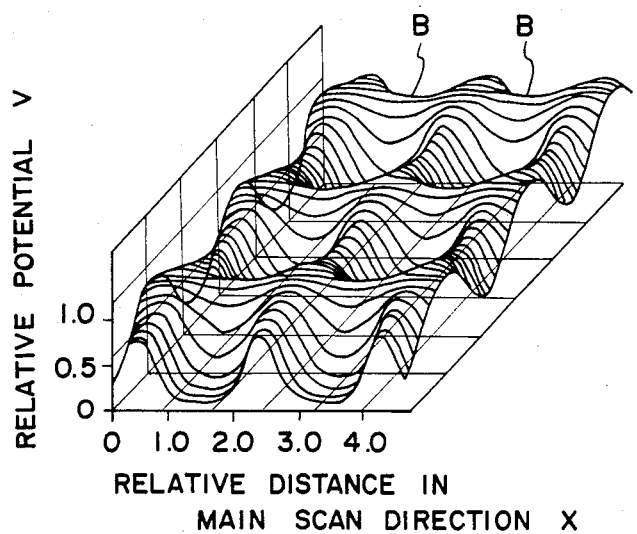
Figure 22C:
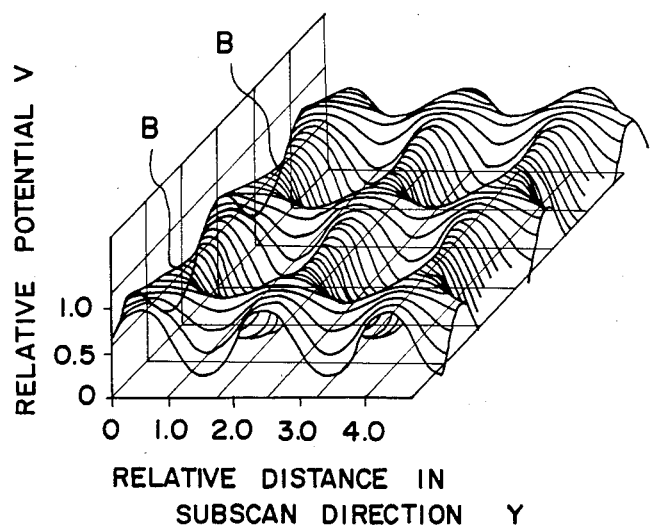

Taking one of the various conditions described so far for example, a two-dimensional distribution will be analyzed. When a pixle-by-pixel grid pattern is drawn under the conditions $\rho_x \simeq 1.18$, $\rho_y \simeq 1.42$ and $Td \simeq 0.7$ so that one dot line in each of the main and subscan directions may be evaluated under the same conditions, the distributions shown in FIGS. 21A–21C hold if the potential distribution is substantially identical in the main and subscan directions, and the distributions shown in FIGS. 22A–22C if the line width ratio satisfies the condition $1.0 \leq lc/lp \leq 1.2$. FIGS. 21A and 22A show distributions of relative exposure energy Q each viewed in the main scan direction, FIGS. 21B and 22B distributions of relative potentials each viewed in the main scan direction, and FIGS. 21C and 22C distributions of relative potentials each viewed in the subscan direction.

It will be apparent from the drawings that the portions labeled A and B in FIGS. 21B, 21C, 22B and 22C represent lines extending in the subscan direction, the potential being slightly lower in the portions A than in the portions B. Needless to mention, the potential distribution width is wider in the portions B than in the portions A.

The above analysis, coupled with experience, teaches that if the ratio of the latent image line widths satisfy the condition $1.0 \leq lc/lp \leq 1.2$, images can be recorded with desirable reproducibility dot on a one-dot line basis.

Concerning negative-to-positive recording, as distinguished from the above-described positive-to-positive recording, it is necessary in tendency that the condition for setting up the relation between the line widths in the main and subscan directions be inverted. In such a case, too, the ratio lc/lp associated with an image portion needs to satisfy the previously mentioned condition. While the method in accordance with this particular embodiment is applicable to both the positive-to-positive recording and negative-to-positive recording, the application to positive-to-positive recording will prove particularly effective in view of the fact that the reproducibility of hairlines are inherently fair in the case of negative-to-positive recording. The increase in the line width in the direction substantially perpendicular to the developing direction will be greately effected by developing characteristics and velocity characteristics of a photoconductive element and, therefore, the ratio lc/lp has to be selected taking such characteristics have into consideration.

As described above, the method in accordance with the fifth embodiment selects an exposing beam diameter and/or a pixel frequency duty in an optical scan type electrophotographic recording apparatus such that the latent image line width in a direction substantially perpendicular to the developing direction becomes greater than one in a direction substantially parallel to the same. Hence, even if the image width is somewhat disturbed by fluctuations in developing characteristics, moving velocity of a photoconductive element and other factors, the method allows even a hairline such as a one-dot line to be desirably reproduced only if the line width ratio is predetermined in consideration of the fluctuations.

A sixth embodiment directed to achieving the sixth embodiment will be described.

The method in accordance with the sixth embodiment is applicable to, for example, the optical scan type electrophotographic recording apparatus 30 shown in FIGS. 6 and 7 which is of the type using, as a light source, the phosphor dot array tube 34 in which phosphor elements are arranged in an array in the main scan direction in a pixel configuration. When a light beam modulated by binary video data 32 and output from the dot array tube 34 is to be focused onto the surface of the drum 40, which is fed in the subscan direction, the method in accordance with the sixth embodiment provides a light beam condition and a light beam scanning condition which confine the ratio between the width lc of a latent image line substantially parallel to the developing direction and the width lc of a latent image line substantially parallel to the developing direction to an otimum range of $1.0 \leq lc/lp \leq 1.3$.

Referring to FIGS. 23A, 23B, 24A, 24B, 25A and 25B, there are shown examples of relative potentials V and relative exposure energy Q in relation to relative distances X and Y in the main scan and subscan directions in an exposure pattern which comprises one line in each of the main scan and subscan directions, provided by varying the light beam condition and the light beam scanning condition in positive-to-positive recording in various ways. The relative distance X or Y represents a ratio of a distance to each pixel pitch in the main scan or subscan direction, the relative potential V a ratio of a surface potential on the drum after exposure to a surface potential (uniform) associated with zero exposure energy, and the relative exposure energy Q a ratio of actual exposure energy to maximum exposure energy.

Figure 23A:
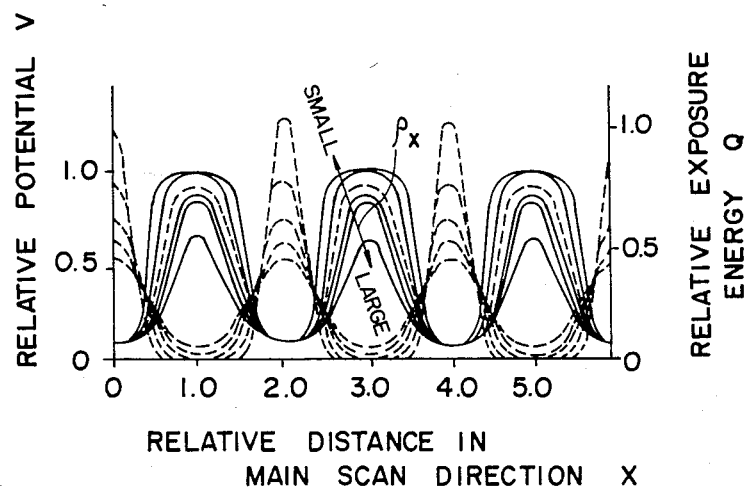
FIGS. 23A and 23B are graphs showing relative potentials with respect to relative distances in the subscan direction and those in the main scan direction provided by $p_y$ of about 0.94 in accordance with the sixth embodiment of the present invention.
Figure 23B:
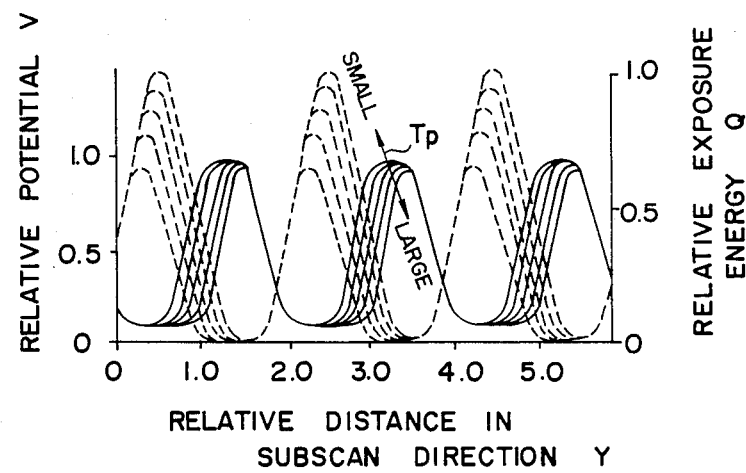

The curves shown in FIGS. 23A and 23B were provided by a ratio $\rho_y$ of a beam diameter in the main scan direction to a pixel pitch in the main scan direction which was about 0.94. In FIG. 23A, the ratio $\rho_x$ of a beam diameter in the main scan direction to a pixel pitch in the main scan direction while, in FIG. 23B, the pixel frequency duty Tp which is the ratio of a light beam exposing time to a one-pixel scanning time is varied. The characteristic indicated a dotted line in FIG. 23A and one indicated by a bold line in FIG. 23B share substantially the same potential distribution and, in such a condition, there are provided $\rho_y = 0.94$, $\rho_x = 1.18$ and $Tp = 0.6$. In this case, by changing the beam diameter in the main scan direction to the pixel pitch in the main scan direction from 1.18 to 1.30 as indicated by a solid line in FIG. 23B, the line width lc in the subscan direction can be made greater than one in the main scan direction and the ratio lc/lp can be confined to the previously mentioned range.

Figure 24A:
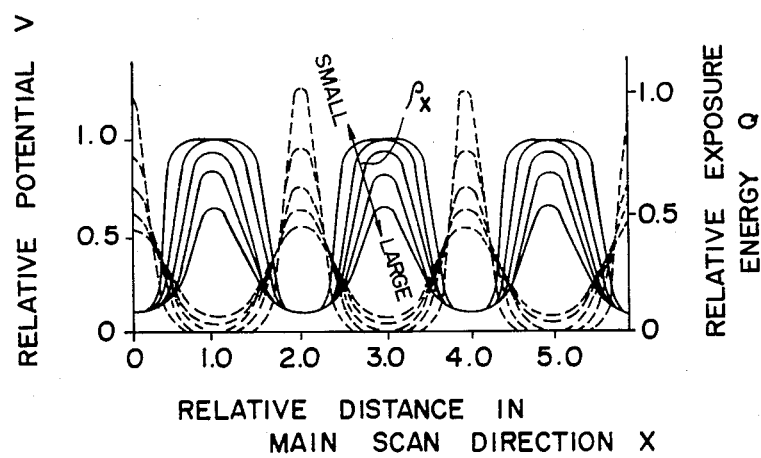
FIGS. 24A and 24B are graphs showing relative potentials with respect to relative distances in the subscan direction and those in the main scan direction provided by $p_y$ of about 1.18.
Figure 24B:
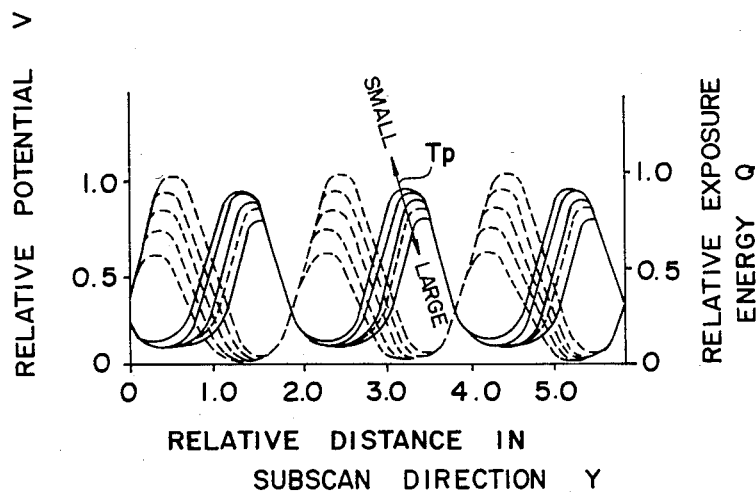

The curves shown in FIGS. 24A and 24B were provided by a ratio $\rho_y$ of a beam diameter in the subscan direction to a pixel pitch in the subscan direction which was about 1.18. In FIG. 24A, the ratio $\rho_x$ of a beam diameter in the main scan direction to a pixel pitch in the main scan direction is varied while, in FIG. 24B, the pixel frequency duty Tp is varied. The characteristic indicated by a bold line in FIG. 24A and one indicated by a dotted line in FIG. 24B share the substantially same potential distribution and, in such a condition, there are provided $\rho_y = 1.18$, $\rho_x = 1.42$ and $Tp = 0.7$. In this case, by changing the pixel frequency duty Tp from 0.7 to 0.6 as indicated by a bold line in FIG. 24B, the line width lc in the subscan direction can be made greater than one in the main scan direction and the ratio lc/lp can be confined to the previously mentioned range.

Figure 25A:
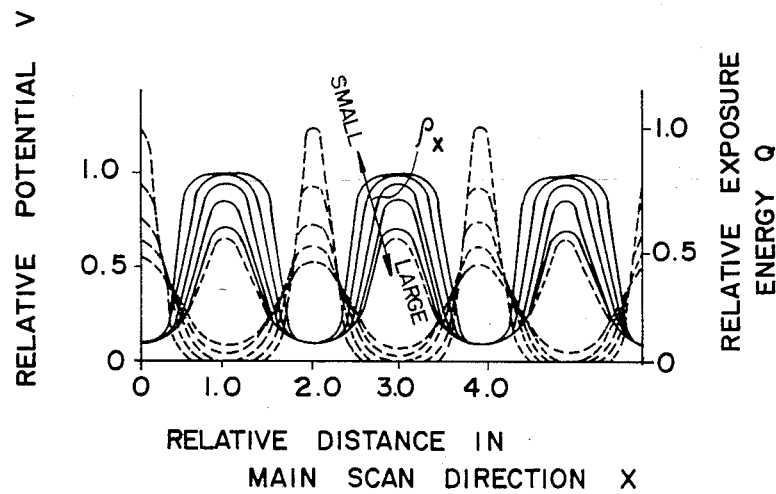
FIGS. 25A and 25B are graphs showing relative potentials with respect to relative distances in the subscan direction and those in the main scan direction provided by $p_y$ of about 1.42.
Figure 25B:
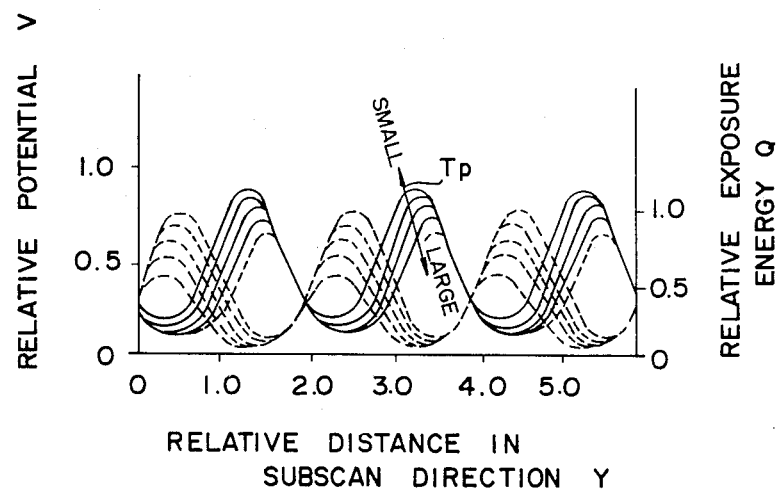

The curves shown in FIGS. 25A and 25B were provided by a ratio $\rho_y$ of the beam diameter in the subscan direction to the pixel pitch in the subscan direction which was about 1.42. In FIG. 25A, the ratio $\rho_x$ of the beam diameter in the main scan direction to the pixel pitch in the main scan direction is varied while, in FIG. 25B, the pixel frequency duty Tp is varied. The characteristic indicated a dotted line in FIG. 25A and one indicated by a dotted line in FIG. 25B share a substantially identical potential distribution and, in such a condition, there are provided $\rho_y=1.42$, $\rho_x-1.65$ and Tp=0.8. In this case, by changing the pixel frequency duty Tp from 0.8 to 0.7 as indicated by a bold line in FIG. 25B and the ratio $\rho_x$ of the beam diameter in the main scan direction to the pixel pitch in the main scan direction as indicated by a bold line in FIG. 25A from 1.65 to 1.42, the latent image line width lc in the subscan direction can be made greater than that in the main scan direction and the ratio lc/lp can be confined in the previously mentioned range.

Further, if $\rho_x$ is suitably varied so that, in the manner descried, the ratio $\rho_x$ of a beam diameter in the main scan direction to a pixel frequency duty Tp and/or a pixel pitch in the main scan direction associated with a potential distribution which is substantially identical in the main scan and subscan directions is varied, the ratio lc/lp will satisfy the previously presented condition.

Figure 26A:
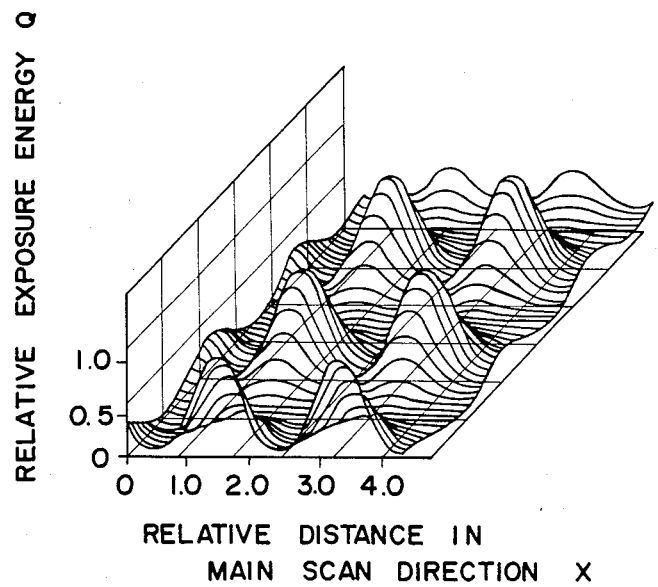
FIGS. 26A and 26B show respectively a distribution of relative exposure energy Q as viewed in the main scan direction and a distribution of relative potentials as viewed in the main scan direction, each being associated with a case wherein a distribution of potentials provided by drawing a pixel-by-pixel grid pattern is substantially equal in both the main and subscan directions.

Taking one of the various conditions described so far for example, a two-dimensional distribution will be analyzed. When a pixle-by-pixel grid pattern is drawn under the conditions $\rho_y=1.18$, $\rho_x=1.42$ and Tp=0.7 so that one-dot line in each of the main and subscan directions may be evaluated under the same conditions, the distributions shown in FIGS. 26A and 26B hold if the potential distribution is substantially identical in the main scan and subscan directions, and the distributions shown in FIGS. 27A and 27B if the line width ratio satisfies the condition $1.0 \leq lc/lp \leq 1.3$. FIGS. 26A and 27A show distributions of relative exposure energy Q each viewed in the main scan direction, FIGS. 26B and 27B distributions of relative potentials each viewed in the main scan direction.

Figure 26B:
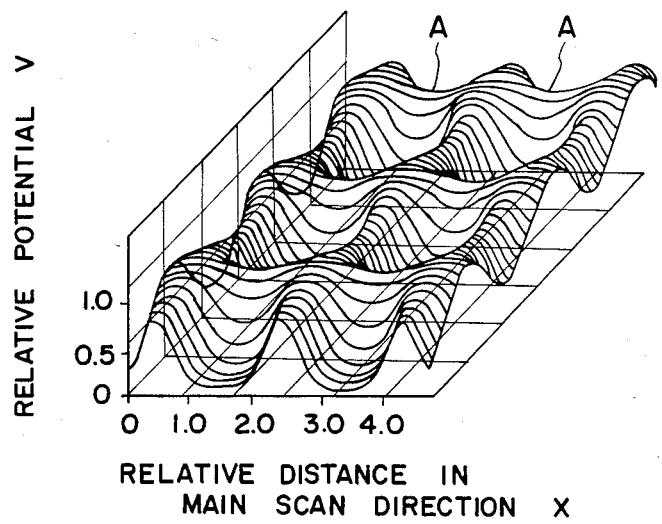
Figure 27A:
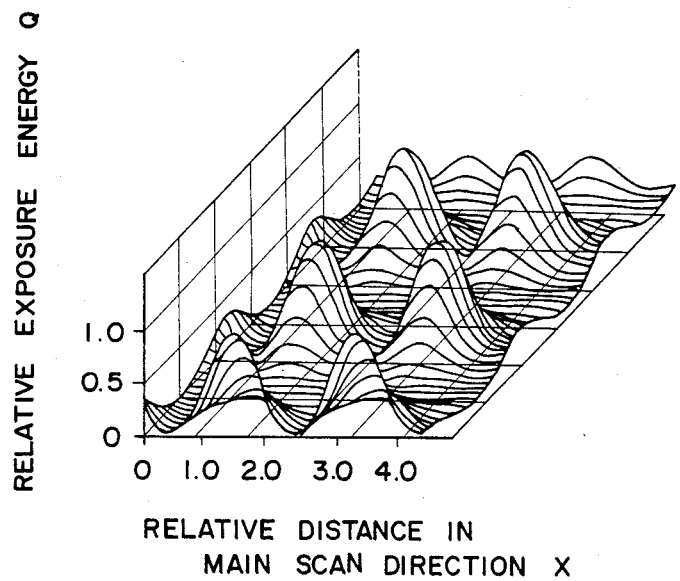
FIGS. 27A and 27B show respectively a distribution of relative exposure energy Q as viewed in the main scan direction and a distribution of relative potentials as viewed in the main scan direction, each being associated with a case wherein a ratio between latent image line widths provided by drawing a pixel-by-pixel grid pattern satisfies a condition in accordance with the present invention.
Figure 27B:
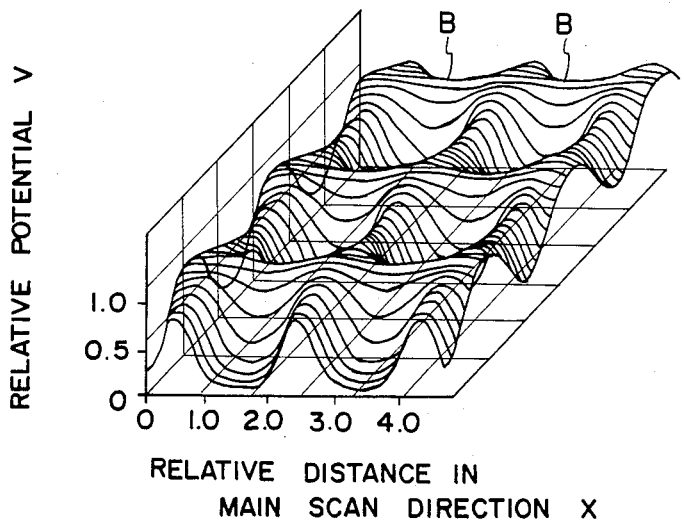

It will be apparent from the drawings that the portions labeled A and B in FIGS. 26B and 27B represent lines extending in the subscan direction, the potential being slightly lower in the portions A than in the portions B. Needless to mention, the potential distribution width is wider in the portions B than in the portions A.

The above analysis, coupled with experience, teaches that if the line width ratio satisfies the condition $1.0 \leq lc/lp \leq 1.3$, images can be recorded with desirable reproducibility on a one-dot line basis.

Concerning negative-to-positive recording, as distinguished from the above-described positive-to-positive recording, it is necessary in tendency that the condition for setting up the relation between the line widths in the main scan and subscan directions be inverted. In such a case, too, the ratio lc/lp associated with an image portion needs to satisfy the previously mentioned condition. While the method in accordance with this particular embodiment is applicable to both the positive-to-positive recording and negative-to-positive recording, the application to positive-to-positive recording will prove particularly effective in view of the fact that the reproducibility of hairlines are inherently fair in the case of negative-to-positive recording. The increase in line width in the direction substantially perpendicular to the developing direction will be greatly effected by developing characteristics and velocity characteristics of a photoconductive element and therefore, the ratio lc/lp has to be selected taking them into account.

As described above, the mentioned in accordance with the sixth embodiment selects an exposing beam diameter and/or a pixel frequency duty in an optical scan type electrophotographic recording apparatus, particularly one which uses miniature light emitting segments as a light source, such that the latent image line width in a direction substantially perpendicular to the developing direction becomes larger than one in a direction substantially parallel to the same. Hence, even if the image width is somewhat disturbed by fluctuations of developing characteristics, moving velocity of a photoconductive element and other factors, the method allows even a hairline such as a one-dot line to be desirably reproduced only if the line width ratio is predetermined in consideration of the fluctuations.

What is claimed is:

1. In an image recording method using an optical scan type electrophotographic recording apparatus which includes means for varying a pulse width of video data which modulate a light beam, the improvement wherein a light beam scans such that at a boundary between an image portion and a non-image portion a ratio of a light beam exposing time to a one-pixel scanning time satisfies a condition $0.2 \leq Td \leq 1.1$.

2. In an image recording method using an optical scan type electrophotographic recording apparatus which modulates by binary video data light issuing from minute light emitting segments which are associated with pixels, passes the modulated light through an imaging system to a surface of a photoconductive element to form an electrostatic latent image, and develops the latent image to record data associated with the video data, the improvement wherein a pulse width of video data for modulating the light issuing from the light emitting segments is varied.

3. The improvement as claimed in claim 2, wherein at a boundary between an image portion and a non-image portion the pulse width of video data is varied such that a ratio Td of an exposing time by the light emitting segments to a one-pixel scanning time satisfies a condition $0.2 \leq Td \leq 1.1$.

4. In an image recording method for an optical scan type electrophotographic recording apparatus, the improvement wherein a light beam scans such that a ratio $\rho_y/\rho_x$ where $\rho_x$ indicates a ratio of a beam diameter in a main scan direction to a pixel pitch in the main scan direction and $\rho_y$ indicates a ratio of a beam diameter in a subscan direction to a pixel pitch in the subscan direction satisfies a condition $1.0 \leq \rho_y/\rho_x \leq 1.5$, and that a product of the ratio $\rho_y$ and a ratio Td of an exposing time by the light beam to a one-pixel scanning time at a boundary between an image portion and a non-image portion satisfies a condition $0.5 \leq \rho_x \cdot Td \leq 1.5$.

5. In an image recording method using an optical scan type electrophotographic recording apparatus which modulates by binary video data light issuing from minute light emitting segments which are associated with pixels, passes the modulated light through an imaging system to a surface of a photoconductive element to form an electrostatic latent image, and develops the latent image to record data associated with the video data, the improvement wherein a pulse width of video data is varied such that a ratio $\rho_y/\rho_x$ where $\rho_x$ indicates a ratio of a beam diameter in a main scan direction to a pixel pitch in the main scan direction and $\rho_y$ indicates a ratio of a beam diameter in a subscan direction to a pixel pitch in the subscan direction satisfies a condition $0.6 \rho_y/\rho_x \leq 1.0$, and that a product of the ratio $\rho_y$ and a ratio Tp of an exposing time to a one-pixel scanning time at a boundary between an image portion and a non-image portion satisfies a condition $0.5 \leq \rho_x \cdot Tp \leq 1.5$.

6. In an image recording method using an optical scan type electrophotographic recording apparatus, the improvement wherein a light beam scans such that a ratio lc/lp where lp indicates a width of a latent image line substantially parallel to a developing direction and lc indicates a width of a latent image line substantially perpendicular to the developing direction satisfies a conditin $1.0 \leq lc/lp \leq 1.2$.

7. The improvement as claimed in claim 6, wherein the developing direction is substantially coincident with an intended direction of movement of a photoconductive element.

8. The improvement as claimed in claim 6, wherein a factor for determining the ratio lc/lp comprises at least one of an exposing beam diameter and a pixel frequency duty.

9. The improvement as claimed in claim 7, wherein a factor for determining the ratio lc/lp comprises at least one of an exposing beam diameter and a pixel frequency duty.

10. In an image recording method using an optical scan type electrophotographic recording apparatus which modulates by binary video data light issuing from minute light emitting segments which are associated with pixels, passes the modulated light through an imaging system to a surface of a photoconductive element to form an electrostatic latent image, and develops the latent image to record data associated with the video data, the improvement wherein a light beam scans such that a ratio lc/lp where lp indicates a width of a latent image line substantially parallel to a developing direction and lc indicates a width of a latent image line substantially perpendicular to the developing direction satisfies a condition $1.0 \leq lc/lp \leq 1.3$.

11. The improvement as claimed in claim 10, wherein the developing direction is substantially coincident with an intended direction of movement of a photoconductive element.

12. The improvement as claimed in claim 10, wherein a factor for determining the ratio lc/lp comprises at least one of an exposing beam diameter and a pixel frequency duty.

13. The improvement as claimed in claim 11, wherein a factor for determining the ratio lc/lp comprises at least one of an exposing beam diameter and a pixel frequency duty.

* * * * *